(12) United States Patent
Kurtz

(10) Patent No.: US 11,833,953 B2
(45) Date of Patent: Dec. 5, 2023

(54) METHOD OF IMPROVING ROAD SAFETY WHEN A SECONDARY VEHICLE IS LOADED ONTO A PRIMARY VEHICLE, A KIT THEREFOR, AND A PRIMARY VEHICLE COMPRISING ENHANCED REAR LIGHTING

(71) Applicant: Dax Kurtz, New Westminster (CA)

(72) Inventor: Dax Kurtz, New Westminster (CA)

(73) Assignee: Dax Kurtz, New Westminster (CA)

( * ) Notice: Subject to any disclaimer, the term of this patent is extended or adjusted under 35 U.S.C. 154(b) by 233 days.

(21) Appl. No.: 17/535,476

(22) Filed: Nov. 24, 2021

(65) Prior Publication Data

US 2023/0158939 A1    May 25, 2023

(51) Int. Cl.
*B60P 3/06* (2006.01)
*B60D 1/62* (2006.01)
*B60Q 1/30* (2006.01)

(52) U.S. Cl.
CPC ............... *B60P 3/062* (2013.01); *B60D 1/62* (2013.01); *B60Q 1/305* (2013.01)

(58) Field of Classification Search
CPC . B60P 3/062; B60P 3/06; B60Q 1/305; B60D 1/62
USPC .......................................................... 340/431
See application file for complete search history.

(56) References Cited

U.S. PATENT DOCUMENTS

| | | | |
|---|---|---|---|
| 2,660,679 A | 11/1953 | Hunt | |
| 2,989,645 A | 6/1961 | Freiden | |
| 3,221,913 A * | 12/1965 | Chamberlain | B60P 1/6427 414/500 |
| 4,005,313 A | 1/1977 | Tibbits | |
| 4,006,453 A * | 2/1977 | Bryant | B60Q 1/38 340/475 |
| 4,405,190 A | 9/1983 | Schroeder | |
| 4,781,393 A | 11/1988 | Jeter | |
| 5,380,141 A * | 1/1995 | Flowers | B60P 3/06 224/310 |
| 5,389,823 A | 2/1995 | Hopkins et al. | |
| 5,393,191 A * | 2/1995 | Alexander | B60P 1/43 414/537 |
| 5,498,910 A | 3/1996 | Hopkins et al. | |
| 5,522,685 A * | 6/1996 | Lessard | B60P 7/14 410/139 |
| 5,701,116 A | 12/1997 | Hoekstra | |
| 5,719,552 A | 2/1998 | Thompson | |
| 5,725,228 A | 3/1998 | Livingston | |
| 5,739,592 A | 4/1998 | Rigsby et al. | |
| 5,886,627 A | 3/1999 | Brady et al. | |
| 5,921,741 A * | 7/1999 | Heimgartner | B60P 3/062 414/494 |
| 6,034,599 A | 3/2000 | Beacom | |
| 6,050,737 A * | 4/2000 | Russell | F16B 7/06 403/43 |
| 6,139,247 A | 10/2000 | Wright | |

(Continued)

*Primary Examiner* — Eric Blount
(74) *Attorney, Agent, or Firm* — Nicholas Garner; Oyen Wiggs Green & Mutala LLP

(57) ABSTRACT

There is provided a first vehicle shaped to be received on a cargo bed of a second vehicle. The first vehicle includes at least one rear light. The first vehicle includes a wiring harness coupled to the rear light of the first vehicle. The wiring harness is connectable to at least one electrically-powered rear light of the second vehicle so as to be powered therefrom and to function in concert therewith.

20 Claims, 22 Drawing Sheets

(56) References Cited

U.S. PATENT DOCUMENTS

| | | | |
|---|---|---|---|
| 6,447,302 B1 | 9/2002 | Davis | |
| 6,481,738 B1 | 11/2002 | Duncan et al. | |
| 6,641,288 B1* | 11/2003 | Olsen | B60Q 1/305 |
| | | | 362/477 |
| 6,981,835 B1* | 1/2006 | Groth | B60P 3/062 |
| | | | 414/537 |
| 7,444,953 B1* | 11/2008 | Player | B63B 45/04 |
| | | | 362/477 |
| 7,928,734 B2 | 4/2011 | Skinner | |
| 8,845,155 B2 | 9/2014 | Rotenberg et al. | |
| 10,164,392 B1 | 12/2018 | Scheim et al. | |
| 2004/0245795 A1* | 12/2004 | Hansen | B60P 3/40 |
| | | | 296/26.08 |
| 2005/0196260 A1* | 9/2005 | Asfeld | B60P 3/062 |
| | | | 414/537 |
| 2007/0092363 A1* | 4/2007 | Morfitt | B60P 3/062 |
| | | | 414/467 |
| 2009/0080992 A1* | 3/2009 | Dusik | B60P 3/08 |
| | | | 410/26 |
| 2009/0132119 A1* | 5/2009 | Froeschl | B60L 1/00 |
| | | | 701/36 |
| 2011/0090072 A1* | 4/2011 | Haldeman | B60Q 1/305 |
| | | | 340/431 |
| 2019/0344705 A1* | 11/2019 | Bart H | B60Q 1/32 |
| 2020/0031267 A1 | 1/2020 | Pelzer | |

* cited by examiner

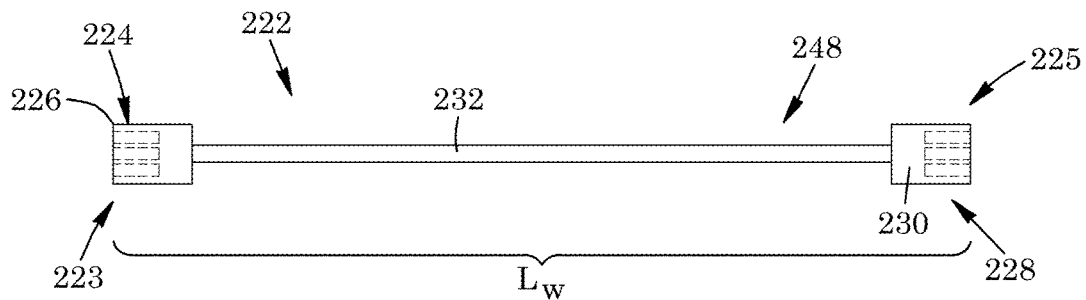
FIG. 12
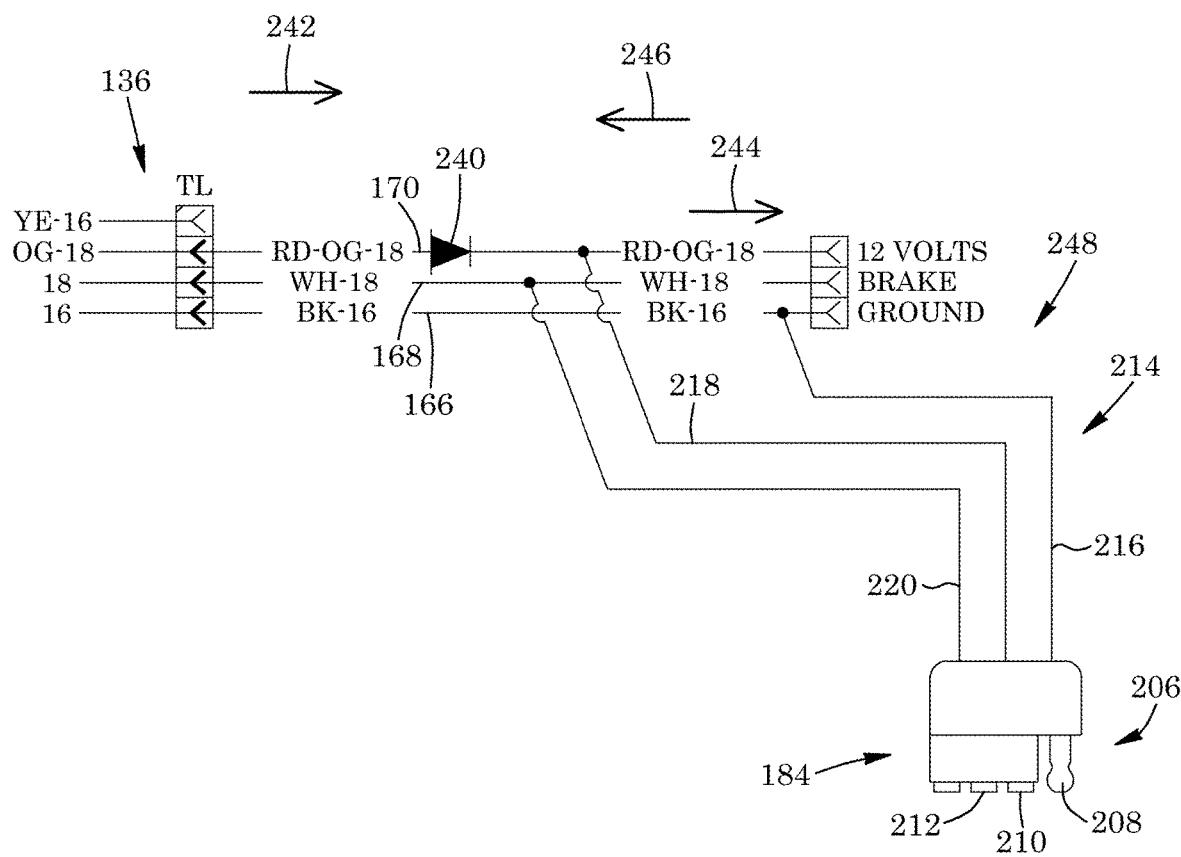
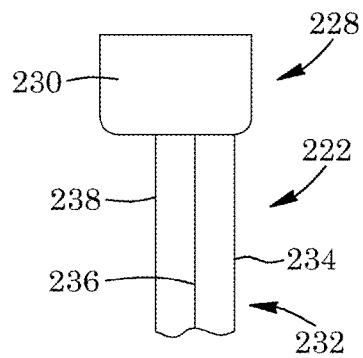
FIG. 13

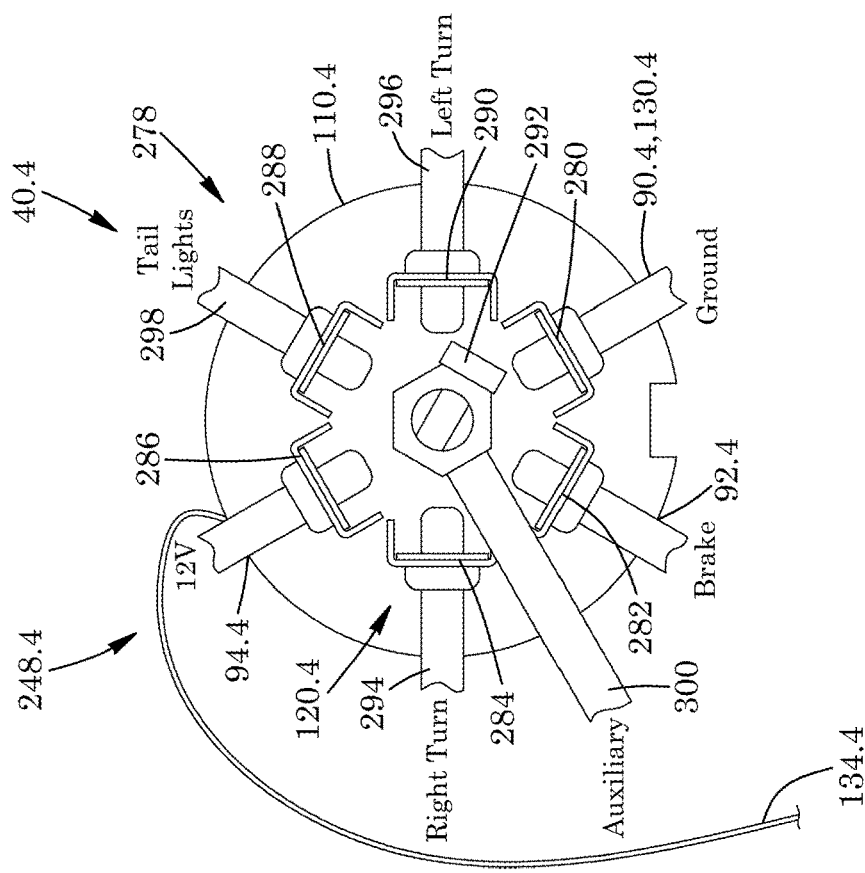
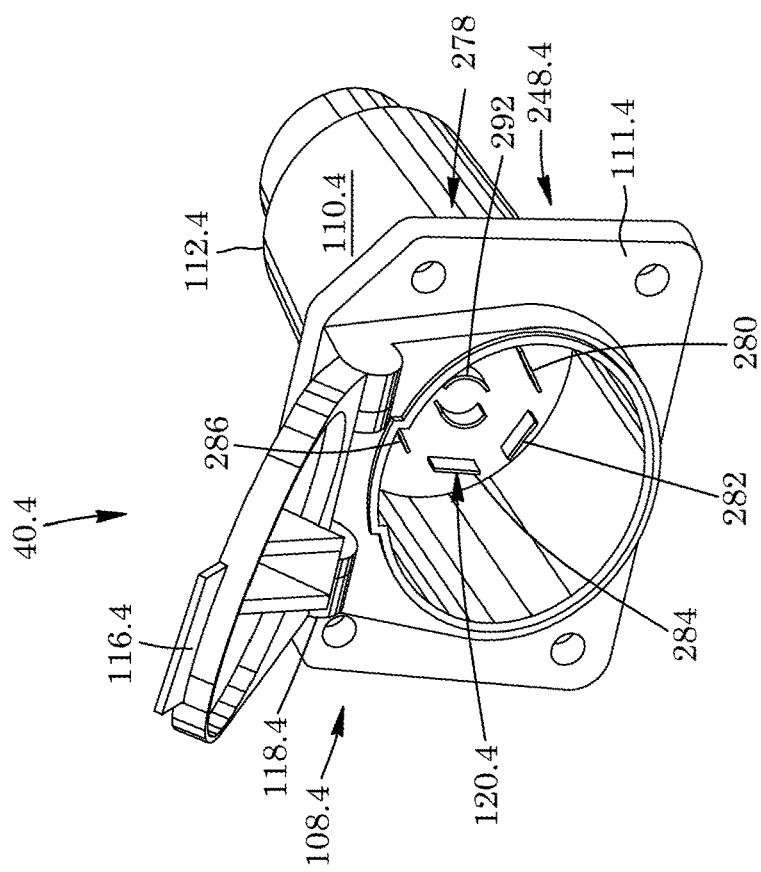

METHOD OF IMPROVING ROAD SAFETY WHEN A SECONDARY VEHICLE IS LOADED ONTO A PRIMARY VEHICLE, A KIT THEREFOR, AND A PRIMARY VEHICLE COMPRISING ENHANCED REAR LIGHTING

BACKGROUND OF THE INVENTION

Field of the Invention

There is provided a method of improving road safety, a kit therefor and a primary vehicle. In particular, there is provided a method of improving road safety when a secondary vehicle is loaded onto a primary vehicle, a kit therefor, and a primary vehicle comprising enhanced rear lighting.

Description of the Related Art

States and provinces may have different laws on how far a load can overhang the cargo bay of pickup trucks and how such loads must be marked. At night may regulations require a light for such marking.

Snowmobiles and all-terrain vehicles, such as quads and side-by-sides, may come close to or contravene such laws without having a marker. Such vehicles loaded onto the pickup truck may furthermore block the truck's third brake light, impairing the purpose of the third brake light thereby. Moreover, snowmobiles and all-terrain vehicles may not be covered by a vehicle accident policy.

Furthermore, trailers upon which snowmobiles, all-terrain vehicles and the like are towed, may be increase the effective overall length of the vehicle which is towing the trailer, may render maneuvering more challenging, may impede the speed with which the vehicle is driven and may be costly to purchase and cumbersome to store, for example.

There may accordingly be a need for a solution to the above longstanding problems.

BRIEF SUMMARY OF INVENTION

There is provided, and it is an object to provide, a method of improving road safety when a first vehicle is loaded onto a second vehicle. The method includes providing the first vehicle with a first electrical interface coupled to the at least one rear light of the first vehicle. The method includes providing the second vehicle with a second electrical interface coupled to at least one rear light of the second vehicle. The method includes coupling together the electrical interfaces via a wiring harness such that the rear lights of the vehicles work in concert, with the at least on rear light of the first vehicle being controlled by and receiving power from the second vehicle. The method may include retrofitting the first vehicle and/or the second vehicle to this end, or manufacturing the first vehicle and/or the second vehicle to include said electrical interfaces in the first instance.

There is also provided a kit for repurposing existing one or more rear lights of a first vehicle to be one or more additional rear lights of a second vehicle upon which the first vehicle is loaded. The kit includes a first electrical interface retrofitted to the first vehicle. The first electrical interface couples to the one or more rears light of the first vehicle. The kit includes a second electrical interface retrofitted to the second vehicle. The second electrical interface couples to at least one electrically-powered rear light of the second vehicle. The kit includes a wiring harness. The wiring harness couples the electrical interfaces together, with the one or more rear lights of the first vehicle coupling to the at least one electrically-powered rear light of the second vehicle so as to be powered therefrom and to function in concert therewith.

There is further provided a primary vehicle with enhanced rear lighting. The primary vehicle has a front, a rear and a pair of spaced-apart sides extend between the front thereof and the rear thereof. The primary vehicle includes first and second rear lights coupled to and aligned with the rear and respective said sides thereof. The primary vehicle includes a third rear light positioned between and elevated relative to the first light and the second light, with the third rear light being repurposed from a secondary vehicle loaded onto the primary vehicle. The primary vehicle includes a wiring harness. The wiring harness couples the third rear light to at least one of the first rear light and the second rear light, such that the third rear light is controlled by and receives power from the primary vehicle.

There is yet also provided a first vehicle shaped to be received on a cargo bed of a second vehicle. The first vehicle includes at least one rear light. The first vehicle includes a wiring harness coupled to the rear light of the first vehicle. The wiring harness is connectable to at least one electrically-powered rear light of the second vehicle so as to be powered therefrom and to function in concert therewith.

There is yet further provided, in combination, the first vehicle and the second vehicle. The first vehicle includes a first electrical interface coupled to the at least one rear light thereof and the second vehicle includes a second electrical interface coupled to the rear light thereof in one example. The second electrical interface is positioned adjacent to the rear light of the second vehicle in one example. The wiring harness is positioned with the cargo bed and enclosed between side walls of the second vehicle in one example. The wiring harness has a length equal to or less than one half of the width of the cargo bed, and equal to or less than one half or one third of the length of the first vehicle.

BRIEF DESCRIPTION OF DRAWINGS

The invention will be more readily understood from the following description of preferred embodiments thereof given, by way of example only, with reference to the accompanying drawings, in which:

FIG. 12 is a front perspective view of the wiring harness thereof;

FIG. 13 is a schematic view of a plurality of wires of the snowmobile together with an electrical interface coupled thereto, and a wiring harness in the process of coupling to the electrical interface, the wiring harness being shown in fragment;

FIG. 23 is a rear, left side perspective view of an electrical interface for a first vehicle or truck according to a fifth aspect, with the electrical interface being part of a kit for repurposing existing one or more rear lights of a second vehicle loaded on the truck, to couple to and work in concern with one or more rear lights of the truck;

FIG. 24 is a schematic view thereof;

DESCRIPTION OF THE PREFERRED EMBODIMENTS

Figure 1:
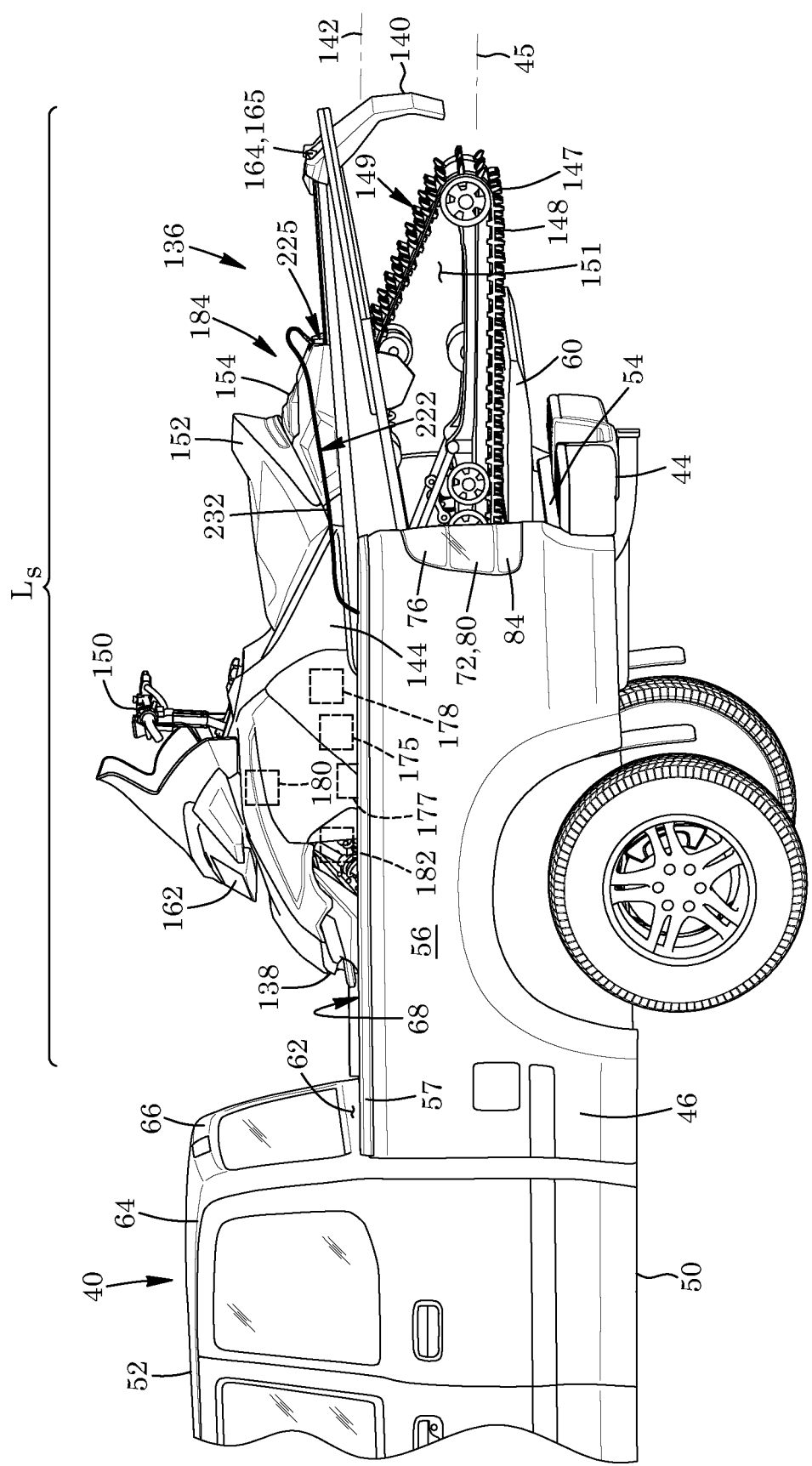
FIG. 1 is a left side perspective view of a snowmobile loaded onto the cargo bed of a truck, with the front of the truck being not shown, with the snowmobile and the truck being according to a first aspect and further including a kit for repurposing existing one or more rear lights of the snowmobile to couple to and work in concert with one or more rear lights of the truck.
Figure 2:
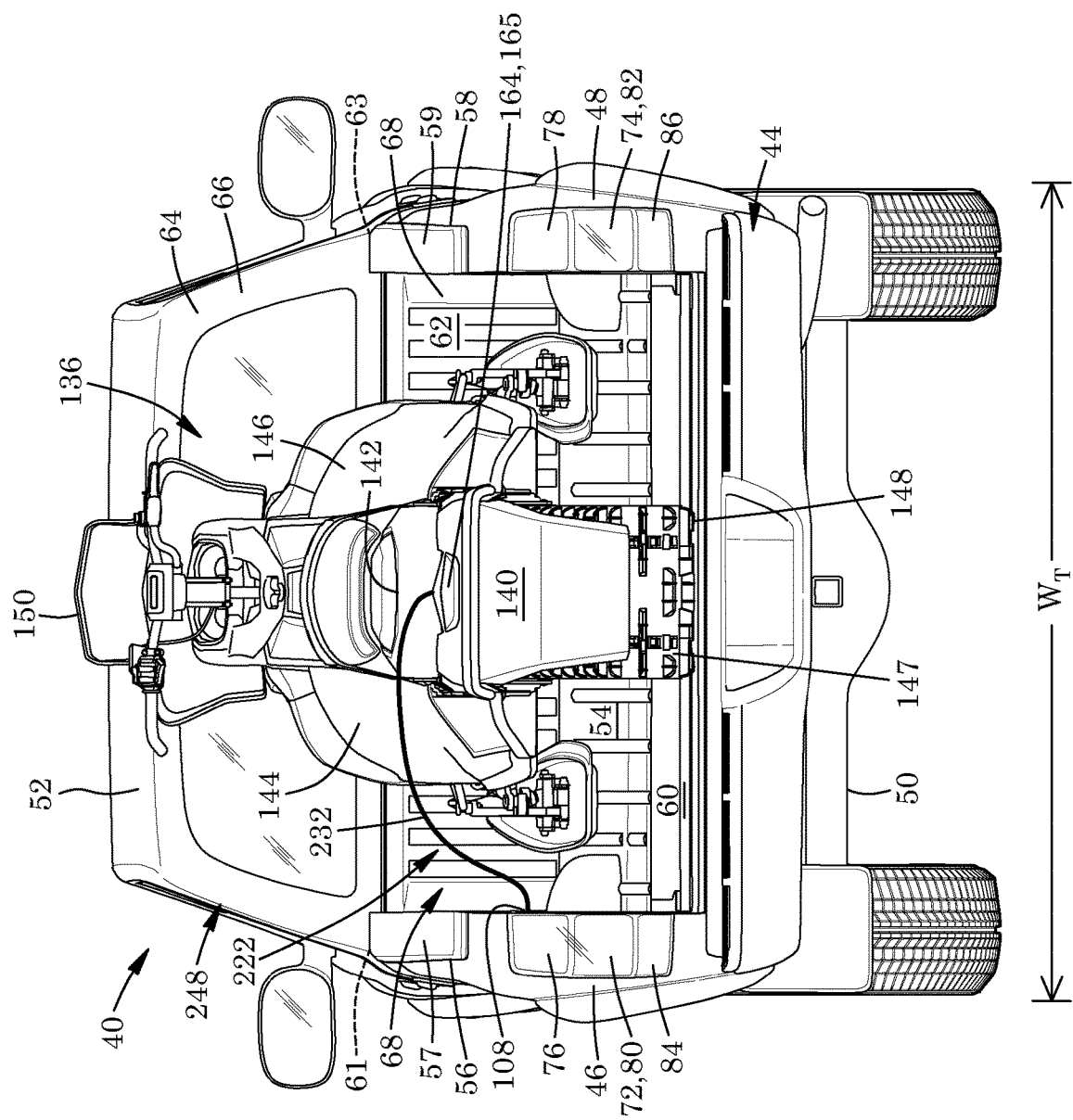
FIG. 2 is a rear perspective view thereof.
Figure 15:
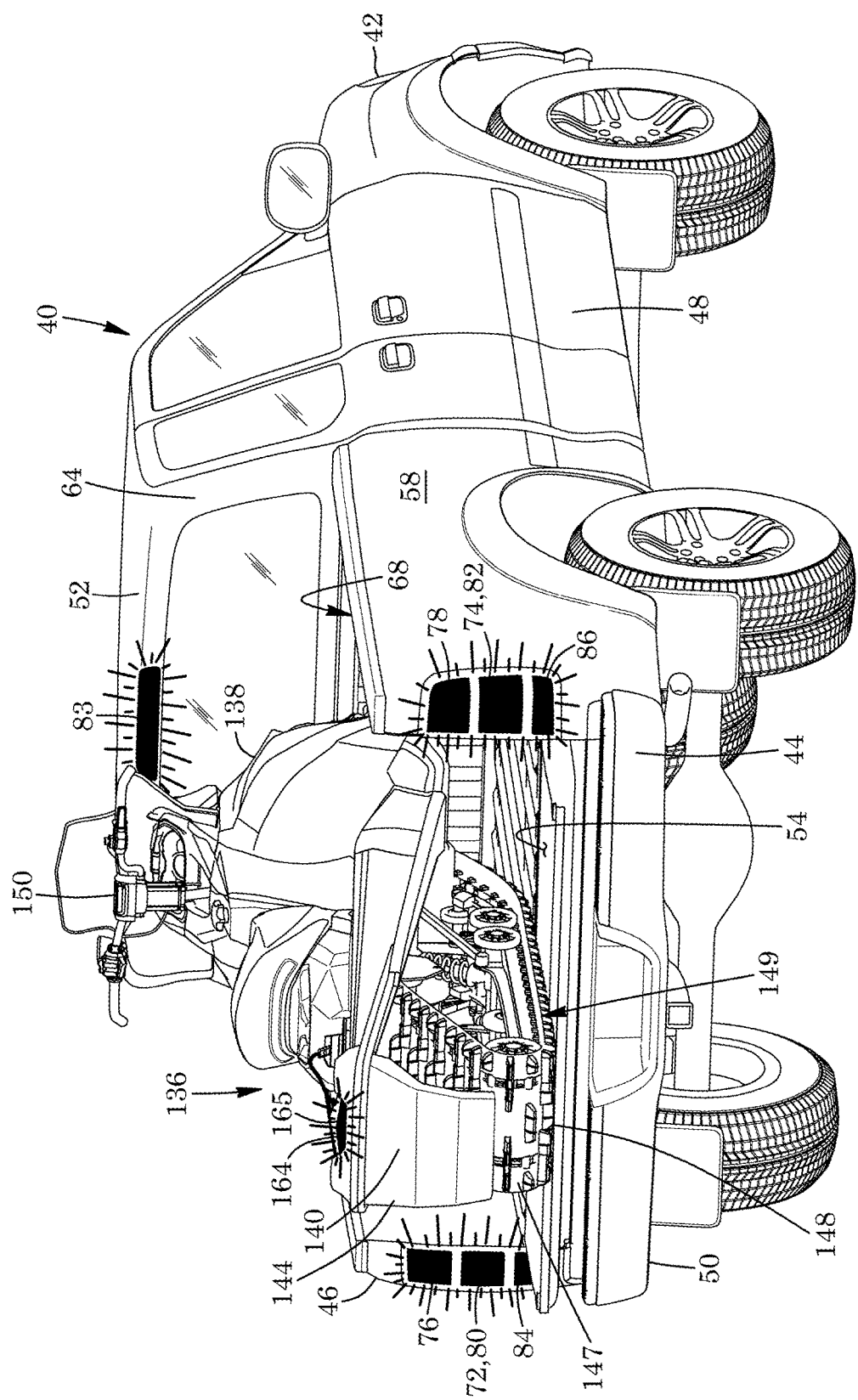
FIG. 15 is a rear, right side perspective view thereof.

Referring to the drawings and first to FIG. 1, there is provided a first or primary vehicle, in this example a truck 40. Referring to FIG. 15, the truck has a front 42, a rear 44, and a pair of spaced-apart sides 46 and 48 extending from the front thereof to the rear thereof. As seen in FIG. 2, the truck 40 has a width $W_T$ extending between the sides thereof. The truck has a bottom 50 and a top 52 spaced-apart from the bottom thereof. The top and bottom of the truck 40 extend between the sides 46 and 48 of the truck.

Still referring to FIG. 2, the truck 40 includes a cargo bed 54. The cargo bed extends from the rear 44 towards the front 42 of the truck and extends between the sides 46 and 48 of the truck. The truck 40 includes a pair of spaced-apart side walls 56 and 58 that couple to and extend upwards from the cargo bed 54. The side walls of the truck extend along and adjacent to the sides 46 and 48 of the truck. As seen in FIG. 2, the truck includes bed rail caps 57 and 59 covering the upper peripheral portions 61 and 63 of the side walls in this example. The truck 40 includes a tailgate 60 that hingedly couples to and extends upwards from the cargo bed 54 adjacent the rear 44 of the truck. The tailgate extends between the side walls 56 and 58 of the truck. The tailgate 60 has a closed position (not shown) in which the tailgate extends vertically and upwards from the cargo bed 54. The tailgate 60 is moveable from the closed position to an open position seen in FIG. 1 in which the tailgate extends horizontally and parallel to the cargo bed 54.

As seen in FIG. 2, the truck 40 has an intermediate wall 62 extending between the side walls 56 and 58 thereof. The intermediate wall of the truck is positioned between the front 42 and rear 44 of the truck and is spaced-apart forward from the tailgate 60. The truck includes a cabin 64 and the intermediate wall 62 aligns with and may be to be part of the rear 66 of the cabin of the truck. The intermediate wall extends from the cargo bed 54 towards the top 52 of the truck. The cargo bed, side walls 56 and 58, tailgate 60 and intermediate wall 62 of the truck define an interior space 68.

Figure 17:
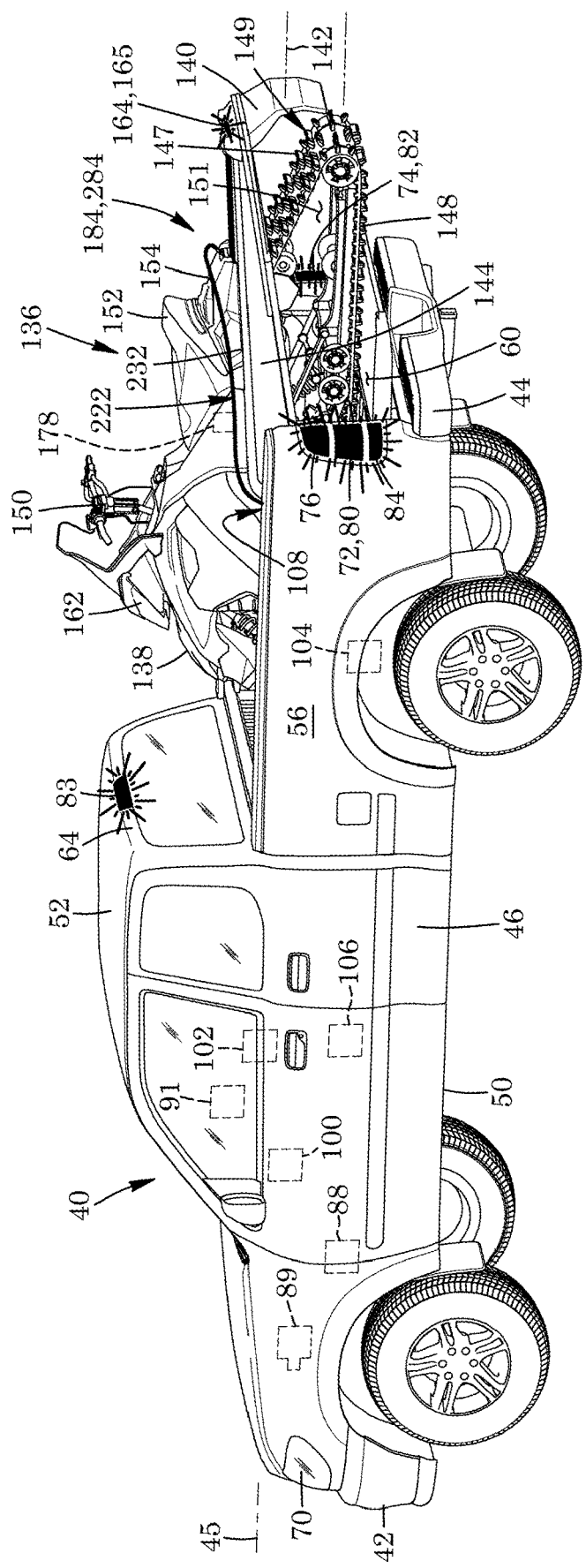
FIG. 17 is a left side, rear perspective view thereof.

As seen in FIG. 17, the truck 40 includes front lights 70 positioned adjacent to the front 42 thereof. As seen in FIG. 2, the truck includes at least and in this example a plurality of rear lights positioned adjacent to the rear thereof, including rear running lights 72 and 74, left and right turn signal lights 76 and 78 and backup or reverse drive lights 84 and 86. The front lights 70 and rear running lights are coupled to a power supply, in this example a battery 88 of the truck seen in FIG. 17. The truck's lights are powered by the battery when the vehicle is turned off and are powered by the truck's alternator 89 and related electrical system when the vehicle is running. Batteries and alternators, including their various parts and functionings thereof, are well known to those skilled in the art and the battery and alternator of the truck 40 will accordingly not be discussed in further detail.

Still referring to FIG. 2, the rear lights of the truck 40 includes a left side or first brake light 80 and a right side or second brake light 82 aligned respective sides 46 and 48 thereof. The lights 76, 72, 80 and 84 may individually and collectively be referred to first side rear lights, and lights 78, 74, 82 and 86 may individually and collectively be referred to as second rear side lights, with the first side and second side rear lights being referred to as a first pair of laterally spaced-apart rear lights of the truck.

As seen in FIG. 17, the rear lights of the truck include a center or third brake light 83 coupled to the rear 66 of cabin 64. The third brake light is centrally positioned between, elevated relative to and positioned forward of the lights 76, 72, 80 and 84, and lights 78, 74, 82 and 86 in this example. The third brake light is positioned between the front 42 and the rear 44 of the truck 40, and is positioned between the sides 46 and 48 of the truck.

Figure 3:
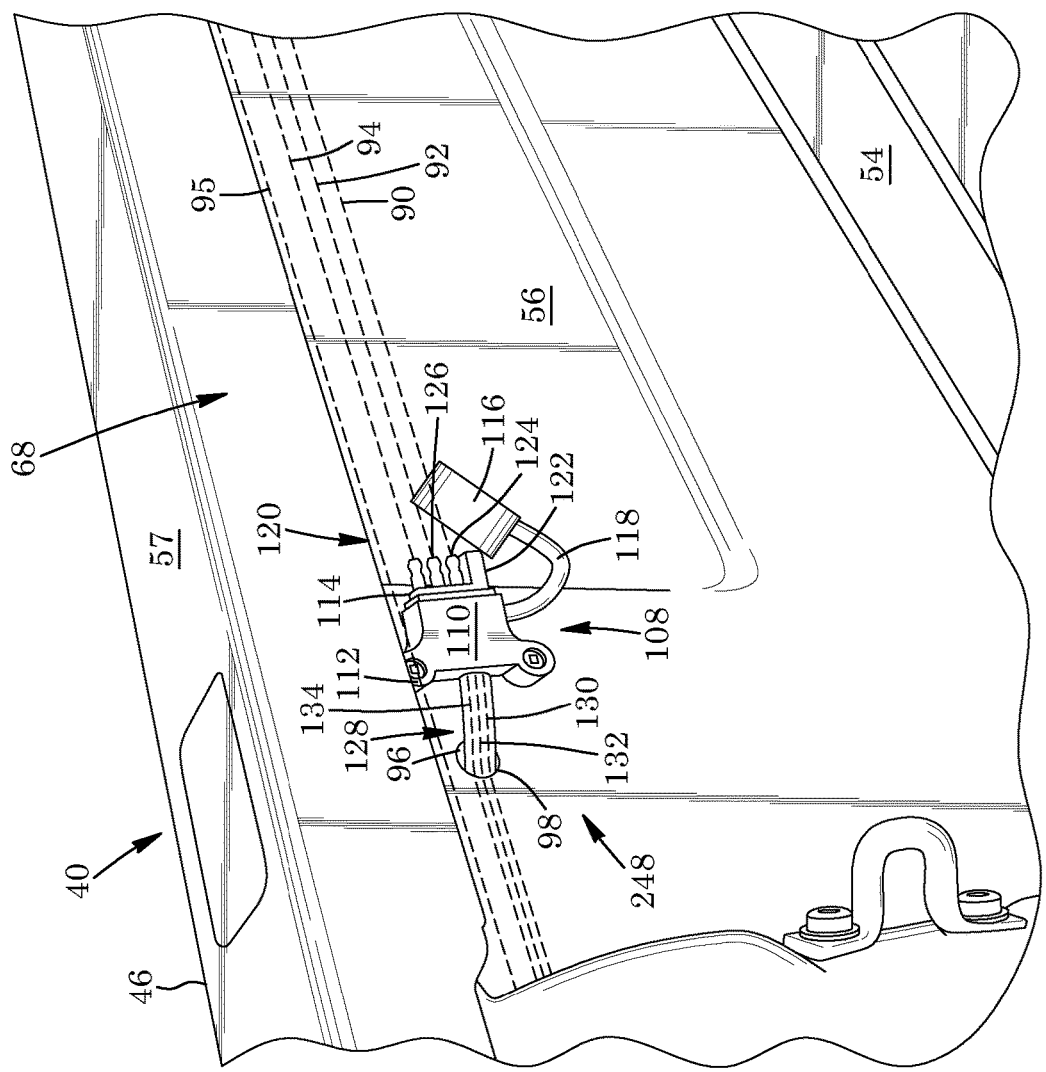
FIG. 3 is a top, inner perspective view of a side wall of the truck of FIG. 1, together an electrical interface of the truck being provided, the electrical interface of the truck extending outwards from the side wall and coupled to rear lights and power supply of the truck, the electrical interface of the truck comprising a housing with a plurality of male plug connectors and a cap shaped to selectively couple to the housing and inhibit access to the male plug connectors, the cap being shown in an open position and the truck being shown in fragment.
Figure 5:
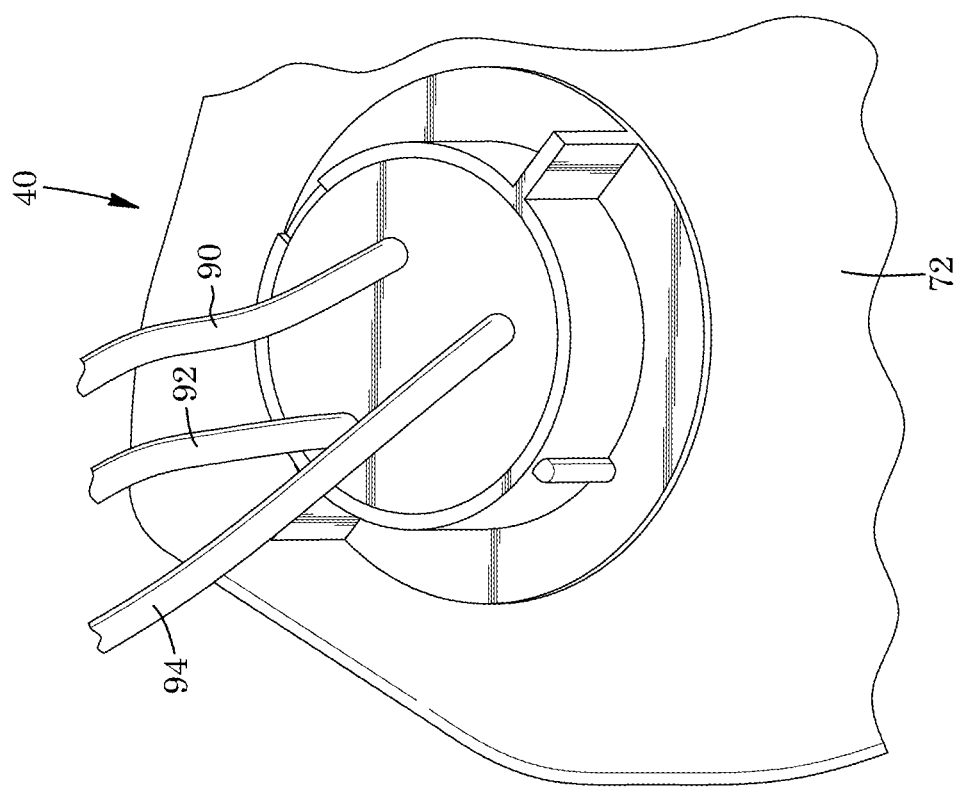
FIG. 5 is a rear perspective view of one of the rear lights of the truck of FIG. 1, with the rear light being shown in fragment and the rest of the truck not being shown.
Figure 6:
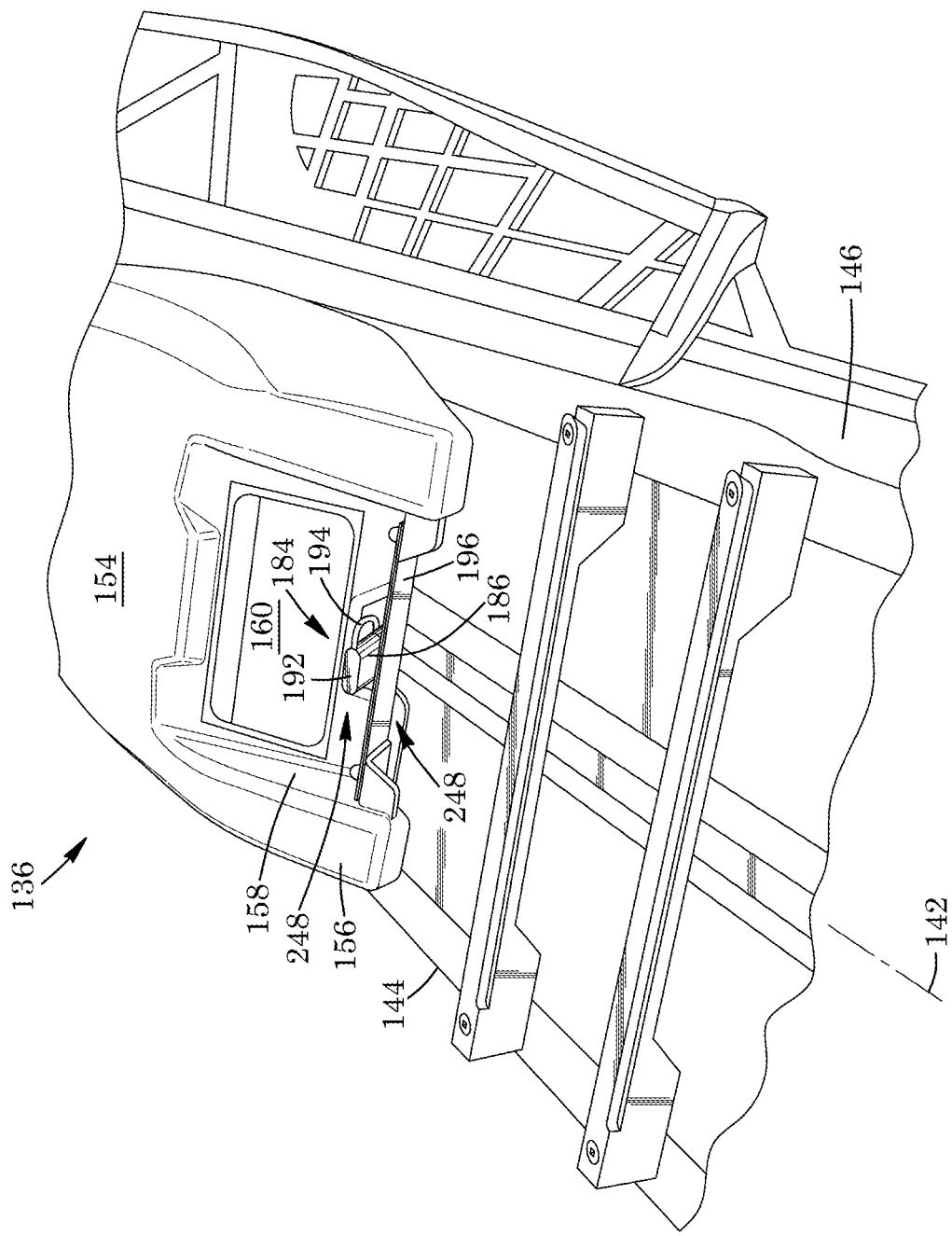
FIG. 6 is a top, rear, right side perspective view of the snowmobile of FIG. 1, with an electrical interface of the snowmobile being provided, the electrical interface of the snowmobile coupling to the rear lights of the snowmobile, the electrical interface of the snowmobile mounting to a rear portion of the seat of the snowmobile via an elongate mounting plate, the electrical interface of the snowmobile including a housing, socket (not shown) positioned within the housing and a cap shown in a close position in which the cap couples to the housing and selectively inhibits access to the electrical socket, and with the snowmobile shown in fragment.

As seen in FIG. 3, the truck 40 includes a plurality of conductors or wires extending from the rear thereof towards the front thereof, in this example including a ground wire 90, a brake light wire 92, a power conductor or running lights wire 94 and a reverse lights wire 95. Referring to FIG. 5, the ground wire 90 is connected to ground. The brake lights wire 92 seen in FIG. 3 couples the brake lights 80, 82 and 83 of the truck 40 to battery 88 and alternator 89 of the truck seen in FIG. 17. The running lights wire 94 seen in FIG. 3 couples the rear running lights 72 of the truck seen in FIG. 2 to battery of the truck seen in FIG. 17. The reverse lights wire 95 seen in FIG. 3 couples the reverse lights 84 and 86 of the truck 40 seen in FIG. 2 to battery 88 and alternator 89 of the truck seen in FIG. 17.

Figure 9:
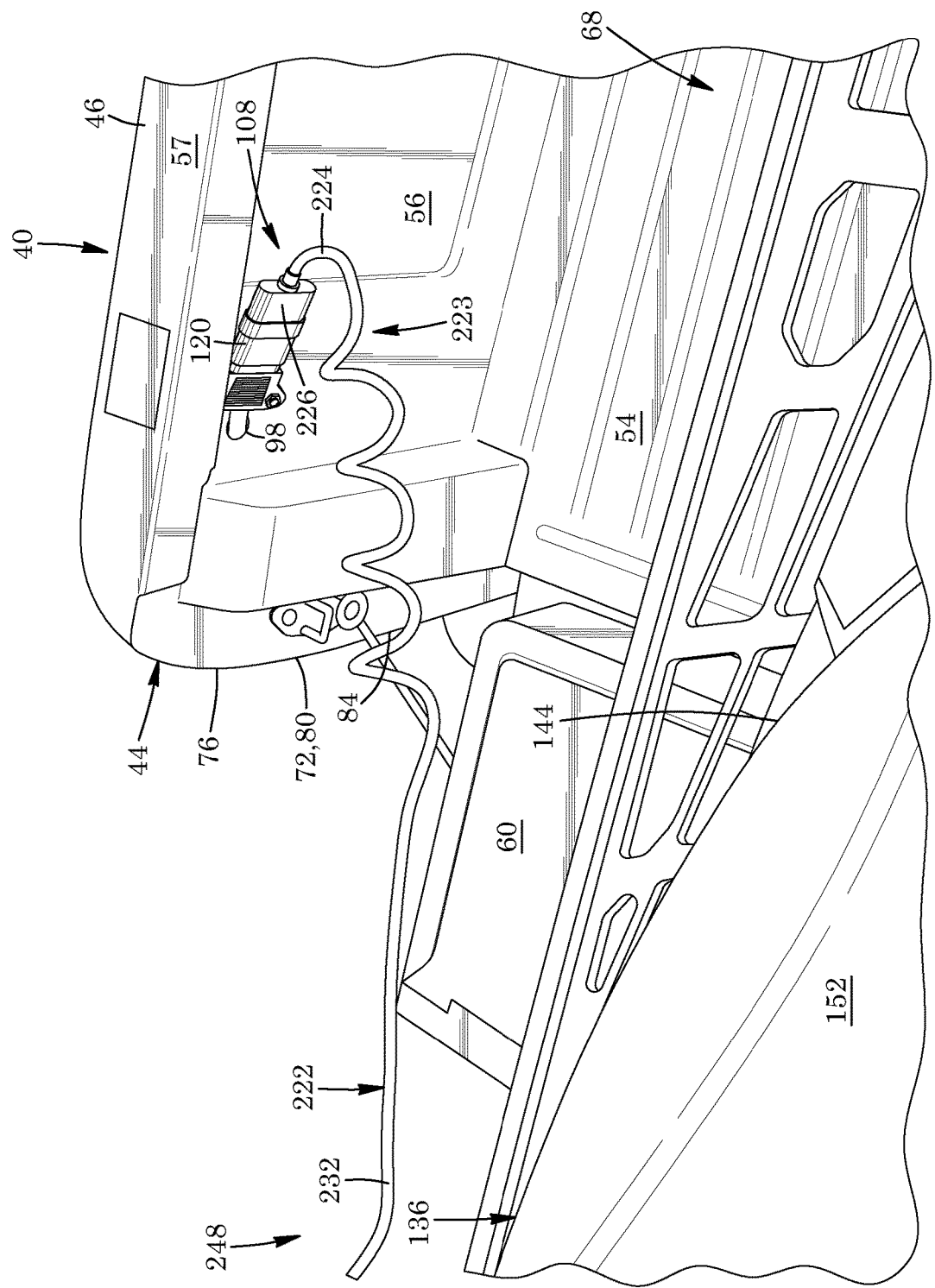
FIG. 9 is a top, inner perspective view of the snowmobile loaded onto the truck, together with a wiring harness including a first end portion shown coupled to the electrical interface of the truck, with the rest of the wiring harness, the truck and the snowmobile being shown in fragment.

Referring back to FIG. 3, the wires 90, 92, 94 and 95 are enclosed within side wall 56 of the truck in this example. The truck 40 has been retrofitted to remove an inner portion 96 of the side wall 56, creating an aperture 98 thereby via which the wires are selectively accessible in this example; however this is not strictly required and the truck may, in the alternative, be manufactured in the first instance to be so configured. The aperture is circular in this example; however, this is not strictly required. The aperture 98 is positioned adjacent bed rail cap 57 in this example. As seen in FIG. 9, the aperture is positioned adjacent to rear lights 72, 76, 80 and 84 in this example.

As seen in FIG. 17, the truck 40 includes a running light control module 100 that enables the operator of the truck to selectively connect the running light wire 94 of FIG. 3 to battery 88 and alternator 89 thereof for selectively turning on the rear running lights 72 and 74 seen in FIG. 2. As seen in FIG. 17, actuating a light switch 91 of the truck 40 causes power to be supplied to the rear running lights of the truck, with the lights being turned on thereby.

As seen in FIG. 17, the truck includes a turn signal system 102 with an indicator stalk (not shown) which when moved to the left or right, activates the left turn or rear turn lights 76 and 78 of the truck seen in FIG. 2. Referring back to FIG. 17, the truck 40 includes a brake system 104 which when actuated connects the respective brake light wires 92 thereof seen in FIG. 3 to the battery 88 and alternator 89 thereof, causing the brake lights 80 and 82 seen in FIG. 2 and brake light 83 seen in FIG. 17 to turn on. As seen in FIG. 17, the truck includes a reverse drive system 106 which, when actuated for backing up the truck, connects the reverse lights wire 95 seen in FIG. 3 to battery 88 and alternator 89 of the truck seen in FIG. 17, causing the reverse drive lights 84 and 86 seen in FIG. 2 to turn on. Turn signal systems, brake systems and reverse drive systems of trucks, including their various parts and functions, are known per se and will not be described in further detail.

As seen in FIG. 3, the truck 40 is retrofitted with an electrical interface 108 in this example; however here too this is not strictly required and the truck may, in the alternative, be manufactured in the first instance to be so configured. The electrical interface mounts in this example to side wall 56 of the truck. As seen in FIG. 9, the electrical interface 108 is mounted adjacent to the rear 44 of the truck and one of the rear lights of the truck in this example, in this case adjacent lights 72, 76, 80 and 84.

Figure 4:
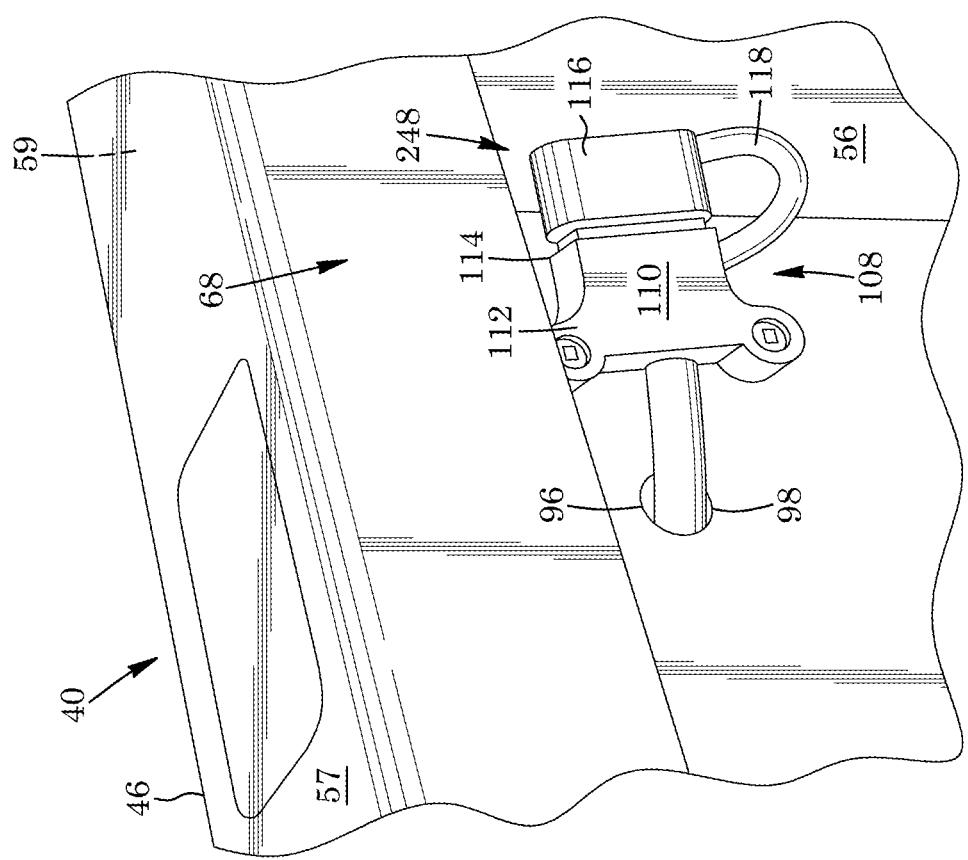
FIG. 4 is a top, inner perspective view thereof, with the cap shown in a closed position in which the cap couples to the housing of the electrical interface of the truck, and with the truck being shown in fragment.

Referring back to FIG. 3, the electrical interface includes a housing 110 that is made of non-conducting material, in this example plastic; however, this is not strictly required. The housing has a first or closed proximal end 112 and a second or open distal end 114. The electrical interface includes a protective member, in this example cap 116 coupled to the housing 110 via a connecting mechanism, in this example a resilient elongate connector strip 118. The cap has a closed position seen in FIG. 4 in which the cap couples to, extends across and covers the distal end 114 of the housing 110. The cap 116 is moveable from the closed position thereof to an open position seen in FIG. 3, in which the cap is spaced at least in part from the distal end of the housing.

Still referring to FIG. 3, the electrical interface 108 includes an electrical socket 120 about which the housing 110 extends in part. The cap 116 encloses the electrical socket when in the closed position thereof seen in FIG. 4 and enables the electrical socket to be accessed when the cap is in the open position seen in FIG. 3. The electrical socket 120 includes a plurality of female connectors including a first or ground wire female connector 122, a second or running lights wire female connector 124, and a third or brake lights wire female connector 126. The electrical interface 108 includes a cable 128 comprising a plurality of connector wires, in this example a ground connector wire 130, a running lights connector wire 132, and a brake lights connector wire 134.

The truck 40 is further retrofitted by extending the cable through aperture 98 of side wall 56 and thereafter: coupling the ground connector wire 130 to the ground wire 90 of the truck; coupling the running lights connector wire 132 to the running lights wire 92 of the truck; and coupling the brake lights connector wire 134 to the brake lights wire 94 of the truck. Here too in the alternative the truck may be manufactured in the first instance in this manner, rather than being retrofitted to this end. The connector wires couple to corresponding wires of the truck 40 via soldering in this example; however, this is not strictly required and the wires may couple together via other manners in other examples. The electrical interface 108 thus couples to one or more light wires of the truck.

As seen in FIG. 1, there is shown a second or secondary vehicle, in this example an off-road vehicle, in this case a snowmobile 136. As seen in FIG. 2, the snowmobile is shaped to be loaded or received on the cargo bed 54 of the truck 40. Referring back to FIG. 1, the snowmobile 136 has a front 138, a rear 140, a longitudinal axis 142 and a length Ls extending between the front thereof and the rear thereof. As seen in FIG. 2, the snowmobile has a pair of spaced-apart sides 144 and 146 extending from the front thereof to the rear thereof. The snowmobile has a bottom 148 and a top 150 spaced-apart from the bottom thereof. The top and bottom of the snowmobile 136 extend between the sides 144 and 146 of the snowmobile.

Figure 14:
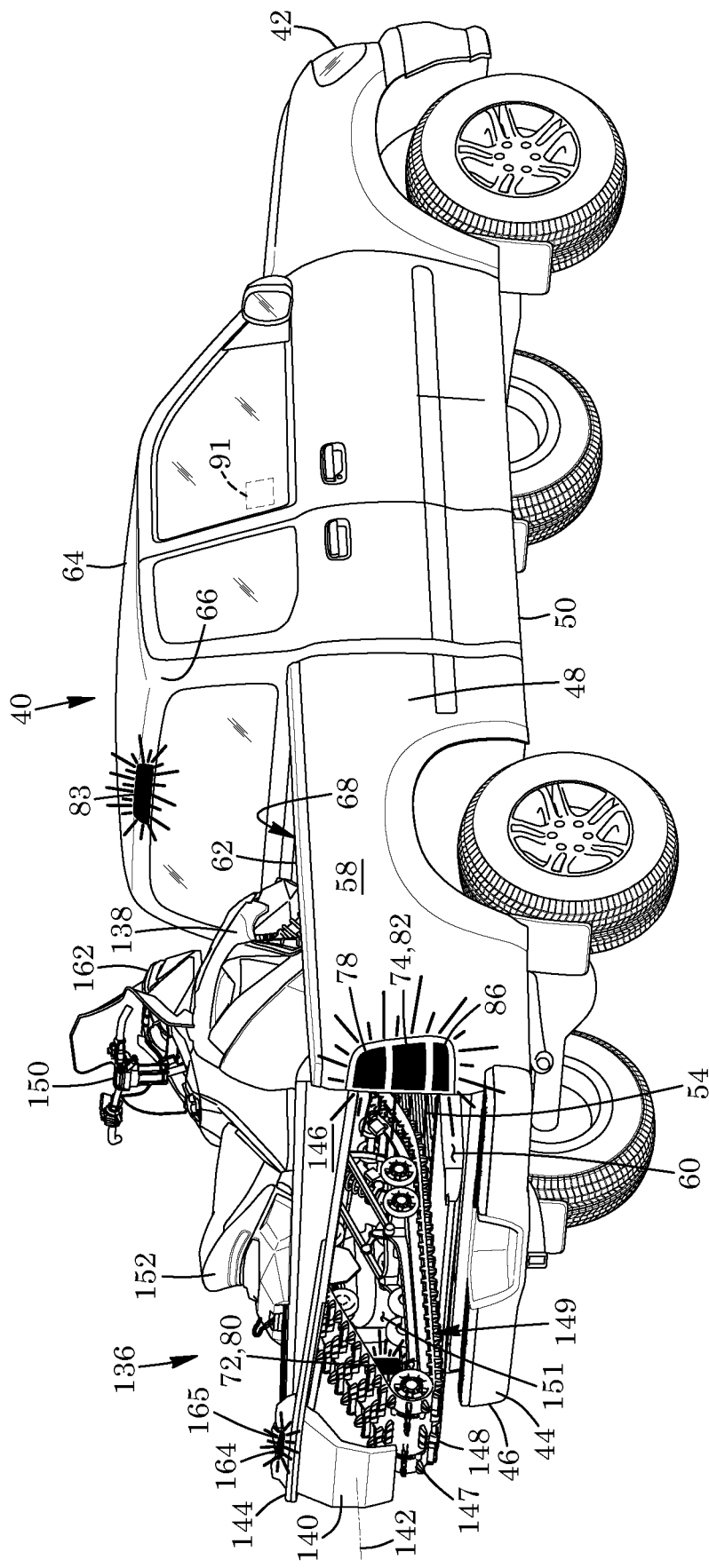
FIG. 14 is a right side, rear perspective view of the snowmobile of FIG. 1 loaded onto the truck of FIG. 1, with the truck and snowmobile so provided with electrical interfaces and coupled together via the wiring harness functioning to cause the rear lights of the truck to work in concert with the rear lights of the snowmobile.

As seen in FIG. 14, the snowmobile 136 includes a loop-shaped snowmobile track 147 positioned towards a rear portion 149 thereof. An aperture 151 extends through the track and rear portion of the snowmobile perpendicular to the longitudinal axis 142 of the snowmobile.

Figure 7:
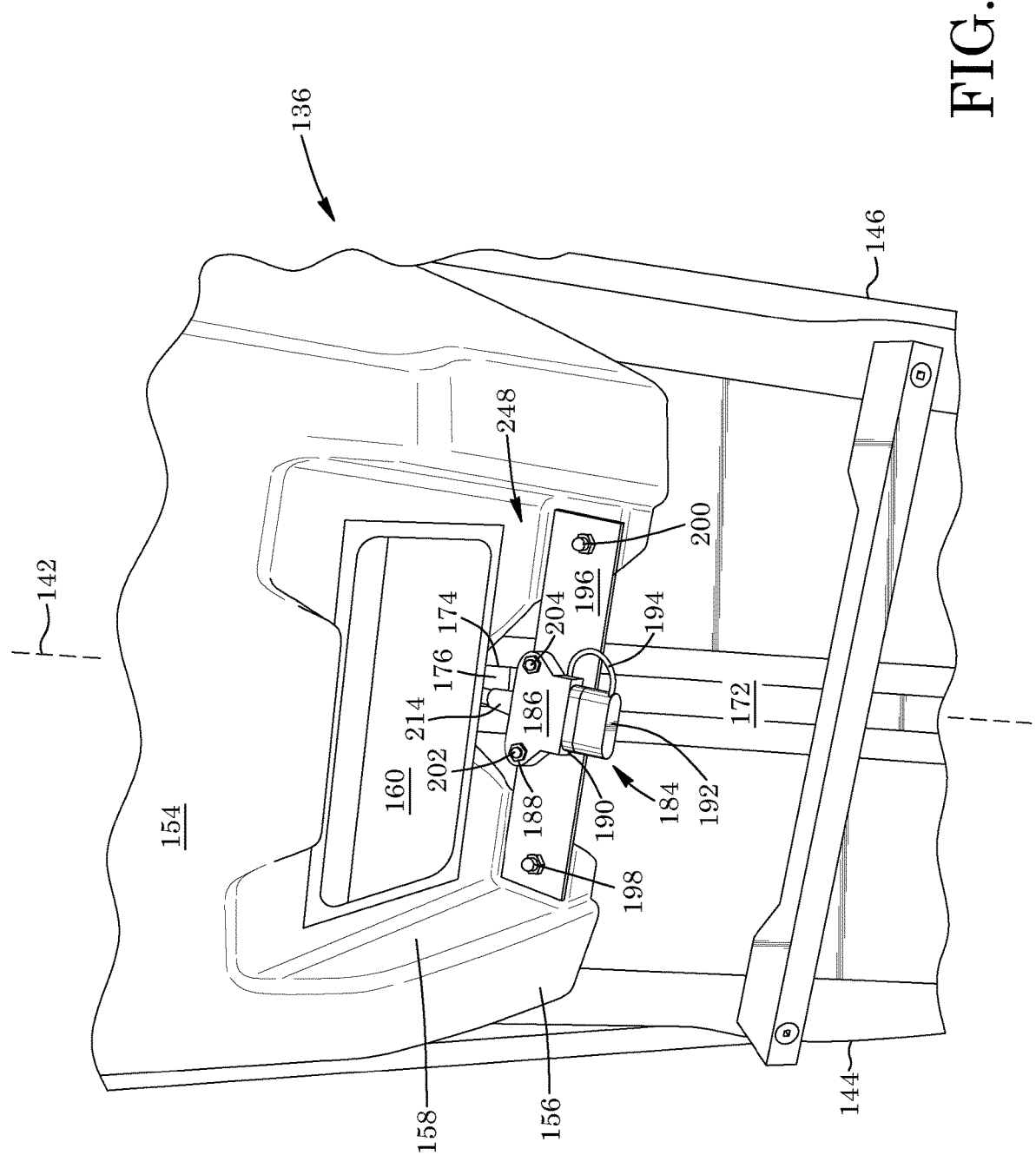
FIG. 7 is a top perspective view thereof, with the snowmobile shown in fragment.

As seen in FIG. 1, the snowmobile 136 includes one or more seats, in this example seat 152 positioned between the front 138 and rear 140 thereof, and extending from near the top 150 towards the bottom 148 thereof. The snowmobile includes a centrally-positioned enclosure or upper body 154. The upper body of the snowmobile 136 is adjacent to and rearward of the seat and may be considered a rear portion of the seat. The upper body 154 of the snowmobile is positioned between the front 138 and rear 140 of the snowmobile. As seen in FIG. 7, the upper body 154 of the snowmobile has a rear 156 with a recessed rear portion 158 within which is mounted a license plate 160.

As seen in FIG. 1, the snowmobile includes one or more front lights or headlamps 162 positioned adjacent to the front thereof. As seen in FIG. 2, the snowmobile 136 includes at least one rear light and in this example two lights: a rear running light 164 and a rear brake light 165. The lights are positioned adjacent to the rear 140 of the snowmobile. The rear lights 164 and 165 of the snowmobile are elevated relative to the rear lights 72, 74, 76, 78, 80, 82, 84 and 86 of the truck 40 when the snowmobile is loaded onto the cargo bed 54 of the truck.

Figure 8:
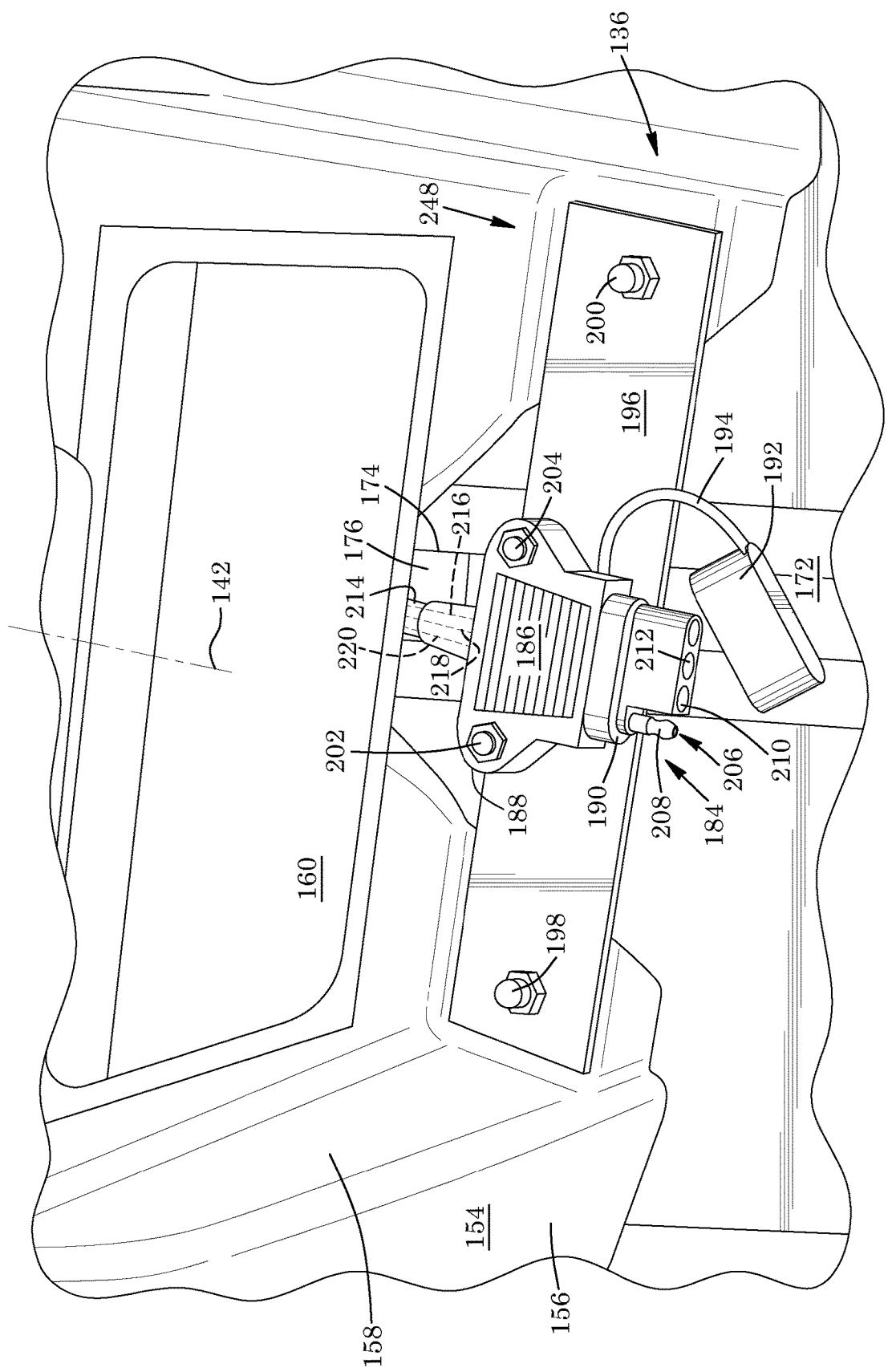
FIG. 8 is a top perspective view thereof, with the cap shown in an open position spaced-apart from the housing so as to expose the electrical socket of the electrical interface of the snowmobile.

As seen in FIG. 13, the snowmobile 136 includes a plurality of conductors or wires extending parallel to the longitudinal axis 142 thereof in this example including a ground wire 166, a brake light wire 168, and a running lights wire 170. As seen in FIG. 8, the wires are enclosed in part by an elongate wiring cover 172 that extends parallel to the longitudinal axis 142 of the snowmobile 136 in this example. Still referring to FIG. 8, the snowmobile 136 has been retrofitted to remove a portion 174 of the wiring cover, creating an aperture 176 thereby via which the wires 166, 168, and 170 are selectively accessible. However, this is not strictly required and in other embodiments instead of being retrofitted, the snowmobile may be manufactured to include a wiring cover with the aperture so formed therein. Ground wire 166 is connected to ground. Brake light wire 168 couples rear brake light 165 of the snowmobile 136 seen in FIG. 1 to a power supply, in this example electrical power generated from the magneto 175 that draws power from the engine 177 of the snowmobile in this example. However, this is not strictly required and alternatively or in addition, the snowmobile may include a battery 178 that powers the lights when the snowmobile is not running, for example. Referring back to FIG. 8, running lights wire 170 couples the headlamps 162 and rear running light 164 of the snowmobile 136 seen in FIG. 1 to battery 178 of the snowmobile.

Figure 20:
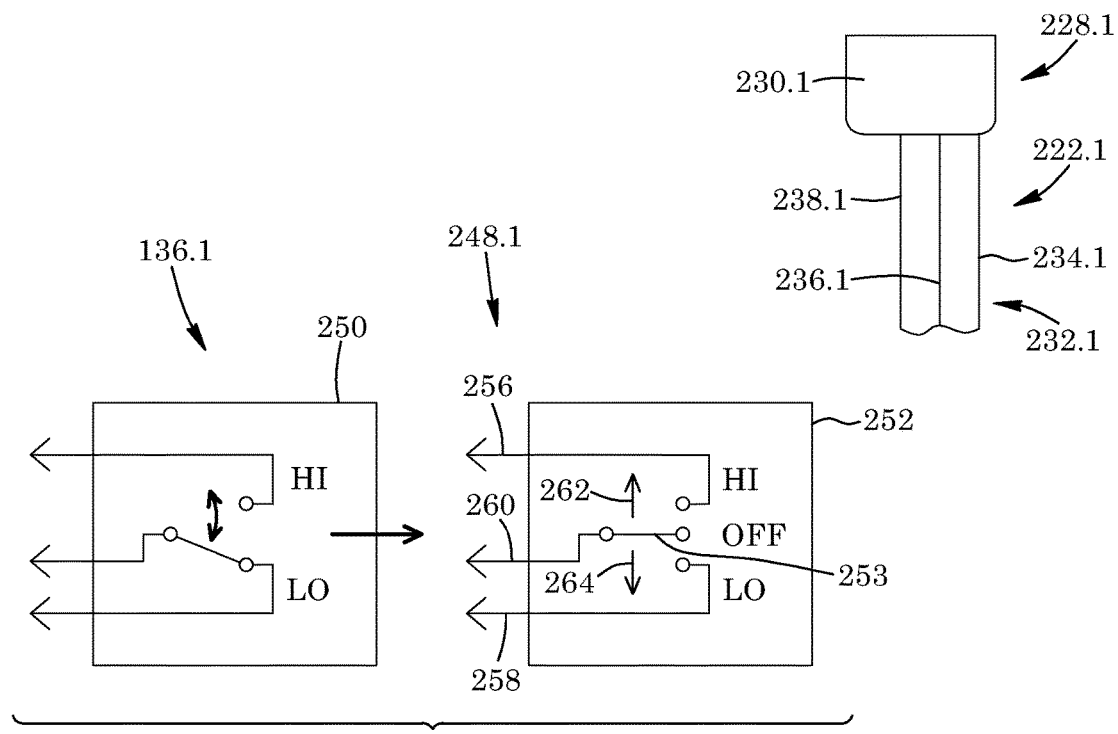
FIG. 20 is a schematic view of a pair of headlamp switches thereof.

The snowmobile includes a light control module 180 that enables the operator of the snowmobile to selectively connect the running light wire 170 of FIG. 8 to the battery 178 thereof seen in FIG. 1 for selectively turning on the headlamps 162 thereof and rear light 164 thereof. The rear light of the snowmobile is always on when the snowmobile or truck 40 is running as with the headlamps of the snowmobile when a conventional two-way high-beam/low-beam headlamp switch module 250 seen in FIG. 20 is actuated. Referring back to FIG. 1, the snowmobile 136 includes a brake system 182 which when actuated connects the brake light wire 168 seen in FIG. 8 to the battery 178 seen in FIG. 1, causing the rear brake light 165 of the snowmobile to turn on. Light control modules 180 and brake systems of snowmobiles, including their various parts and functionings, are known per se and will not be described in further detail.

Figure 11:
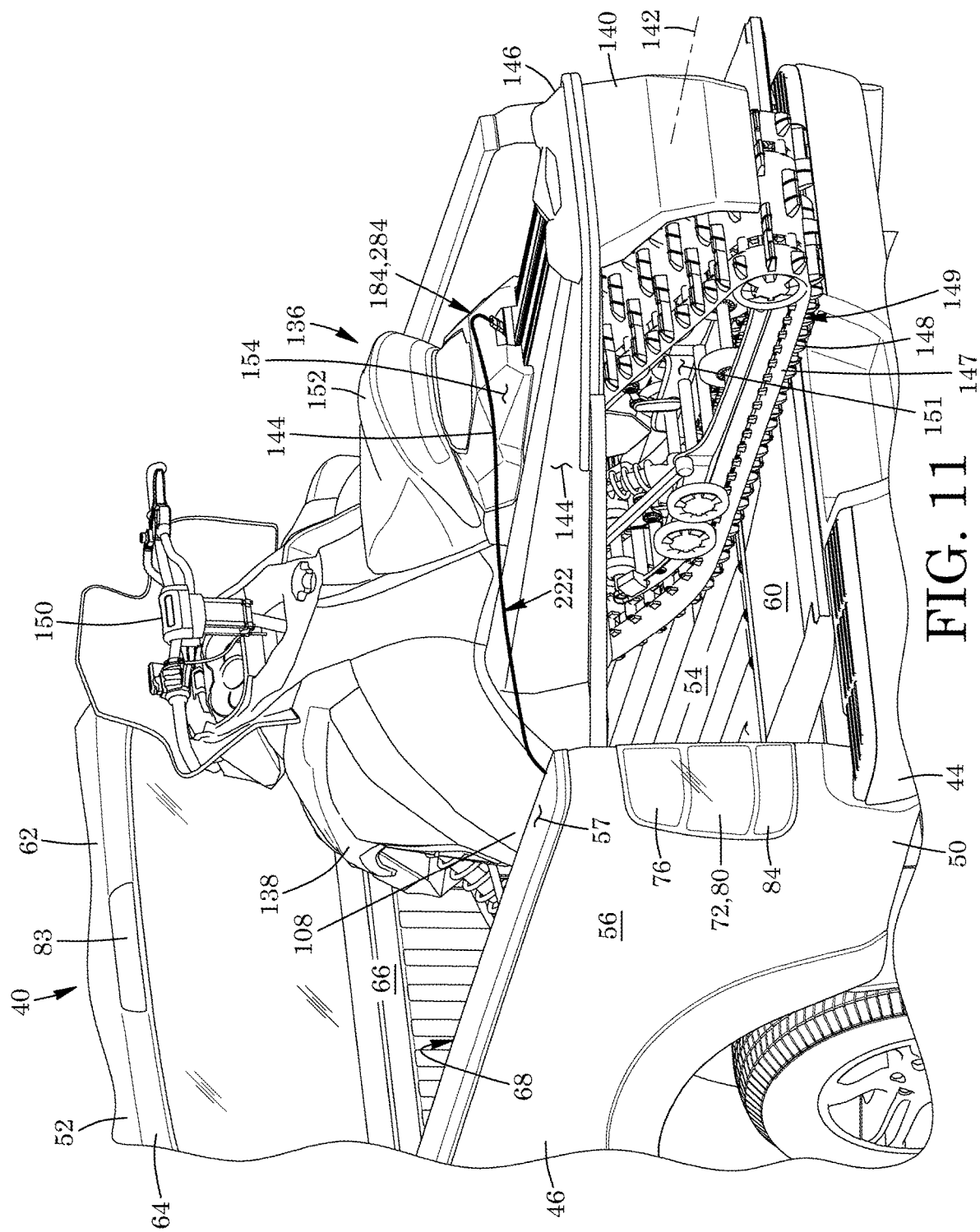
FIG. 11 is a rear, left side perspective view of the snowmobile of FIG. 1 loaded onto the truck of FIG. 1, with the wiring harness of FIG. 10 shown extending between and coupling to the electrical interfaces of the truck and the snowmobile, with the second end portion of the wiring harness aligning with and/or being forward of the rear of truck and the wiring harness being positioned between the side walls of the truck, with the truck and snowmobile being shown in fragment.

As seen in FIG. 7, the snowmobile 136 is retrofitted with an electrical interface 184 in this example; however this is not strictly required and the snowmobile may, in the alternative, be manufactured in the first instance to be so configured. As seen in FIG. 11, the electrical interface is positioned between the front 138 and rear 140 of the snowmobile 136 in this example. The electrical interface 184 is positioned rearward of seat 152 of the snowmobile in this example.

Referring back to FIG. 7, the electrical interface includes a housing 186 that is made of non-conducting material, in this example plastic; however, this is not strictly required. The housing has a first or closed proximal end 188 and a second or open distal end 190. The electrical interface includes a cap 192 coupled to the housing 186 via a connecting mechanism, in this example a resilient elongate connector strip 194. The cap has a closed position seen in FIG. 7 in which the cap couples to, extends across and covers the distal end 190 of the housing 186. The cap is moveable from the closed position thereof to an open position seen in FIG. 8, in which the cap is spaced at least in part from the distal end of the housing.

As seen in FIG. 7, the snowmobile 136 has been retrofitted to include an elongate member, in this example an elongate mounting plate 196 coupled thereto in this example; however this is not strictly required and the snowmobile may, in the alternative, be manufactured in the first instance to be so configured. The elongate mounting plate is rigid and rectangular in shape in this example; however, the latter is not strictly required. The elongate mounting plate extends between the sides 144 and 146 of the snowmobile 136 and extends perpendicular to the longitudinal axis 142 of the snowmobile in this example; however, this is not strictly required. The mounting plate 196 couples to the snowmobile adjacent to elongate wire covering 172. In this example the mounting plate couples to the rear 156 of the upper body 154 of snowmobile 136 via a pair of spaced-apart fasteners, in this example bolts 198 and 200. The mounting plate 196 extends across the recessed rear portion 158 of the upper body of the snowmobile and is positioned below license plate 160 in this example; however, this is not strictly required. The housing 186 of the electrical interface 184 mounts to the elongate mounting plate. The housing couples to the snowmobile thereby in this example via a pair of fasteners, in this example bolts 202 and 204 extending through the proximal end 188 thereof.

Still referring to FIG. 8, the electrical interface 184 includes an electrical socket 206 about which the housing 186 extends in part. The cap 192 encloses the electrical socket when in the closed position thereof seen in FIG. 7 and enables the electrical socket to be accessed when the cap is in the open position seen in FIG. 8. The electrical socket 206 includes a plurality of female connectors including a first or ground wire female connector 208, a second or running lights wire female connector 210, and a third or brake lights wire female connector 212. The electrical interface 184 includes a cable 214 comprising a plurality of connector wires, in this example a ground connector wire 216, a running lights connector wire 218, and a brake lights connector wire 220. The ground connector wire, running lights connector wire, and brake lights connector wire electrically couple to the ground wire female connector 208, running lights wire female connector 210 and brake lights wire female connector, respectively.

The snowmobile 136 is further retrofitted by extending the cable through aperture 176 and, as seen in FIG. 13, thereafter: coupling the ground connector wire 216 to the ground wire 166 of the snowmobile; coupling the brake lights connector wire 220 to the brake light wire 168 of the snowmobile; and coupling the running lights connector wire 218 to the running lights wire 170 of the snowmobile. Here too this is not strictly required and the snowmobile may, in the alternative, be manufactured in the first instance to be so configured. The connector wires couple to corresponding wires of the snowmobile via soldering in this example; however, this is not strictly required and the wires may couple together via other manners in other examples. The electrical interface 184 thus couples to one or more light wires of the snowmobile.

As seen in FIGS. 12, there is provided a wiring harness 222. The wiring harness includes a first end portion 223 and a second end portion 225 spaced-apart from the first end portion thereof. The wiring harness has a length $L_W$ extending from the first end portion thereof to the second end portion thereof. The length of the wiring harness 222 is equal to or less than one half of the length Ls of the snowmobile seen in FIG. 1: in this example the length of the wiring harness is equal to or less than one third of the length of the snowmobile. In this example the length $L_W$ of the wiring harness 222 seen in FIG. 12 is equal to or less than one half of the width $W_T$ of the truck 40 seen in FIG. 12 in this example.

Still referring to FIG. 12, the wiring harness includes a first electrical interface 224 adjacent the first end portion 223 thereof. The first electrical interface of the wiring harness 222 comprises in this example an electrical connector plug 226 shaped to selectively couple with the electrical socket 120 of electrical interface 108 of truck 40 seen in FIGS. 3 and 9. As seen in FIG. 9, the first end portion 223 of the wiring harness 222 is positioned forward of the rear lights 72, 76, 80 and 84 of the truck 40 and forward of the rear lights 164 and 165 of the snowmobile 136 seen in FIG. 1.

Referring back to FIG. 12, the wiring harness 222 includes a second electrical interface 228 adjacent the second end portion 225 thereof. The second electrical interface of the wiring harness comprises in this example an electrical connector plug 230 shaped to selectively couple with the electrical socket 206 of electrical interface 184 of snowmobile 136 seen in FIGS. 8 and 10. As seen in FIG. 1, in this example the second end portion 225 of the wiring harness 222 couples to the snowmobile 136 forward of the rear lights 164 and 165 of the snowmobile. The wiring harness is positioned between the headlamps 162 and rear lights 164 and 165 of the snowmobile in this example.

As seen in FIG. 2, the wiring harness is positioned between the sides 46 and 48 and side walls 56 and 58 of the truck 40. In this example and as seen in FIG. 2, the wiring harness 222 is enclosed at least in part by the side walls of the truck. The wiring harness extends from the first side 46 of the truck 40 towards the second side 48 of the truck. As seen in FIG. 1, the wiring harness 222 is positioned between the intermediate wall 62 and the tailgate 60 of the truck in this example. As seen in FIG. 9, the wiring harness remains at least in part within the cargo bed 54 and interior space 68 of the truck 40 in use in this case. The wiring harness 222 is thus enclosed by at least in part by the truck.

As seen in FIG. 9, the first end portion 223 of the wiring harness is positioned adjacent to the rear lights 72, 76, 80 and 84 and tailgate 60 of the truck 40 in this example. This may function to reduce the effective overall length of the wiring harness. As seen in FIG. 1, the wiring harness 222 extends from the rear 44 of the truck towards the front of the truck. The second end portion 225 of the wiring harness aligns with the rear 44 of the truck 40 in this example; however, this is not strictly required. As seen with reference to FIGS. 1 and 9, the wiring harness 222 extends overtop of and along the tailgate 60 in this example at least in part.

As seen in FIG. 12, the wiring harness 222 includes a cable 232 extending between the plugs 226 and 230 thereof. The cable comprises a plurality of conductors or wires as seen in FIG. 13, in this example a ground wire 234, a running lights wire 236 and brake light wire 238. The plug 230 and socket 206 couple together ground wire 234 and ground connector wire 216, with ground wire 234 thus coupling to ground wire 166 of the snowmobile 136. The plug and socket couple together running lights wire 236 and running lights connector wire 218, with running light wire 236 thus coupling to running lights wire 166 of the snowmobile 136. The plug 230 and socket 206 couple together brake lights wire 238 and brake lights connector wire 220, with brake lights wire 236 thus coupling to brake lights wire 168 of the snowmobile 136. Similarly and referring to FIGS. 3 and 13, plug 226 and socket 120 couple together: ground wires 234, 130 and 90; running lights wires 236, 132 and 92; and brake lights wires 238, 134 and 94.

The running lights wire 92 of truck 40 seen in FIG. 3 thus couples to the running lights wire 166 of the snowmobile 136 seen in FIG. 13 and rear lights 164, 165, 72 and 74 of the snowmobile and truck seen in FIG. 17 to battery 88 and alternator 89 of the truck. The brake lights wire 94 of the truck seen in FIG. 3 thus couples to the brake lights wire 168 of the snowmobile seen in FIG. 13 and lights 164, 165, 80 and 82 of the snowmobile and truck seen in FIG. 17 to the brake system 182 and battery of the truck.

As seen in FIG. 2, the wiring harness 222 thus couples the rear lights 164 and 165 of the snowmobile 136 to the electrically-powered rear lights 72, 74, 76, 78, 80, 82, 84 and 86 of the truck so as to be powered therefrom and to function in concert therewith. The running rear light and brake rear light (if applicable) of the snowmobile are thus configured to work and turn on using the electrical power of the truck.

Referring to FIGS. 1 and 13, the snowmobile 136 is retrofitted to include a mechanism to inhibit power from the truck 40 to operate of the headlamps 162, in this example in the form of a diode 240 seen in FIG. 13 in this example. However this is not strictly required and the snowmobile may, in the alternative, be manufactured in the first instance to be so configured The diode couples to and is positioned in series with the running lights wire 166. The diode 240 is positioned to enable current from the battery 180 of the snowmobile 136 seen in FIG. 1 to flow in a first direction 242. The diode enables current from the truck to flow in a first direction 244 to selectively turn on the rear running light 164 of the snowmobile 136 seen in FIG. 1. Referring back to FIG. 12, the diode 240 is configured to inhibit current from the truck 40 to flow in a second direction 246, thereby inhibiting headlamps 162 of the snowmobile to turn on as a result of power suppled by the truck. The diode is thus a one-way diode positioned to prevent the headlamps from turning on when the rear running lights of the snowmobile are turned on and are provided with power via the power supply of the truck. Thus, the snowmobile 136 in this embodiment uses a stock two-pole headlamp high-beam/low-beam switch (not shown) in conjunction with diode 240 so as to not backfeed to headlamps when powered by the truck.

In operation and referring to FIG. 14, actuating light switch 91 of the truck 40 causes the rear running lights 72 and 74 of the truck and rear running light 164 of the snowmobile 136 to turn on. Activating the brake system 104 of the truck seen in FIG. 17 causes brake lights 80, 82 and 83 of the truck to turn on, as well as brake light 165 of the snowmobile.

Figure 16:
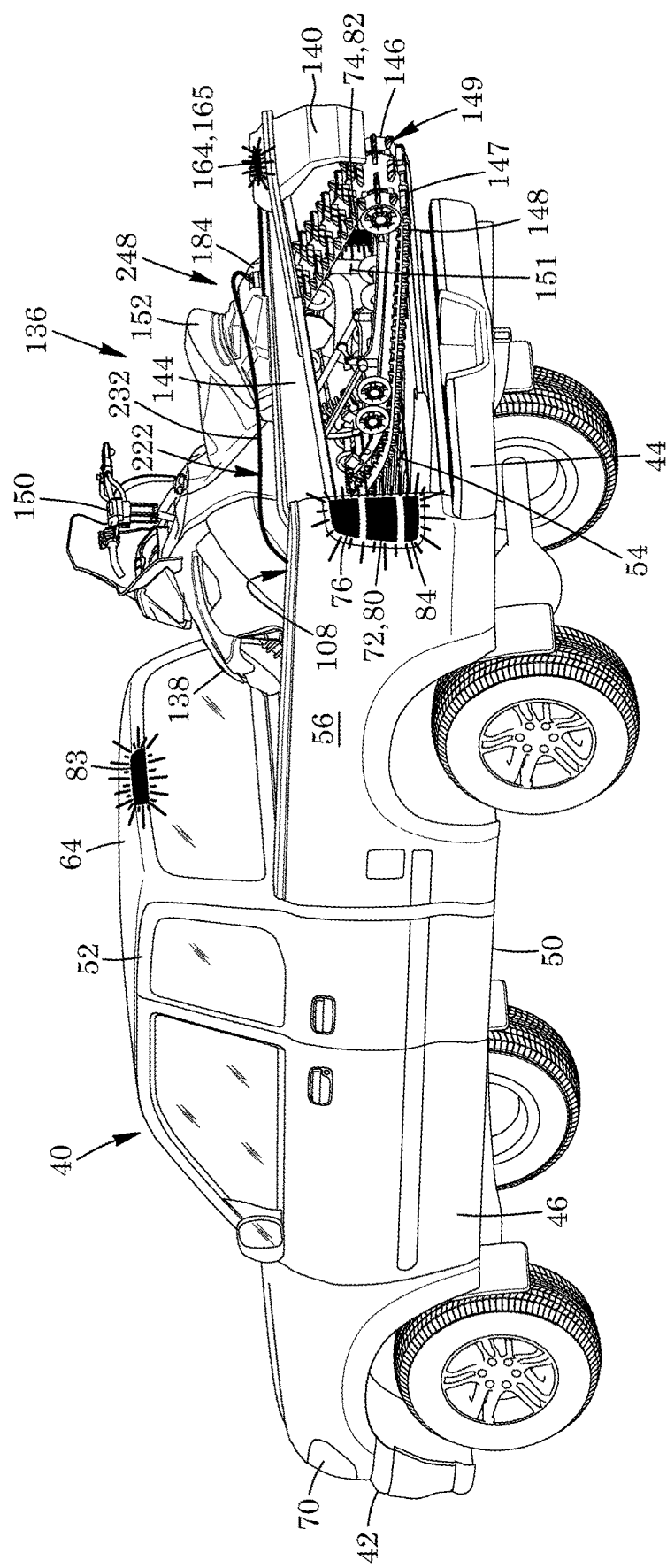
FIG. 16 is a left/rear perspective view thereof.

Referring to FIG. 16, there is thus effectively provided a truck 40 with a left side rear light 72, 80, a right side rear light 74, 82, a third rear light 165 positioned between and being elevated and rearward relative to the first and second rear lights, with the third rear light being repurposed from the snowmobile 136 loaded onto the truck. As seen in FIGS. 14, 16 and 17, rear lights 72, 80 and rear lights 74, 82 are visible through the snowmobile from the rear/side of the truck, in this case visible through the aperture 151 extending through the rear portion 149 of the snowmobile. As seen in FIG. 17, the truck so retrofitted or configured includes lights 72, 80 and 74, 82 which are all visible at positions axially rearward and offset relative to the rear 44 and longitudinal axis 45 of the truck.

Figure 18:
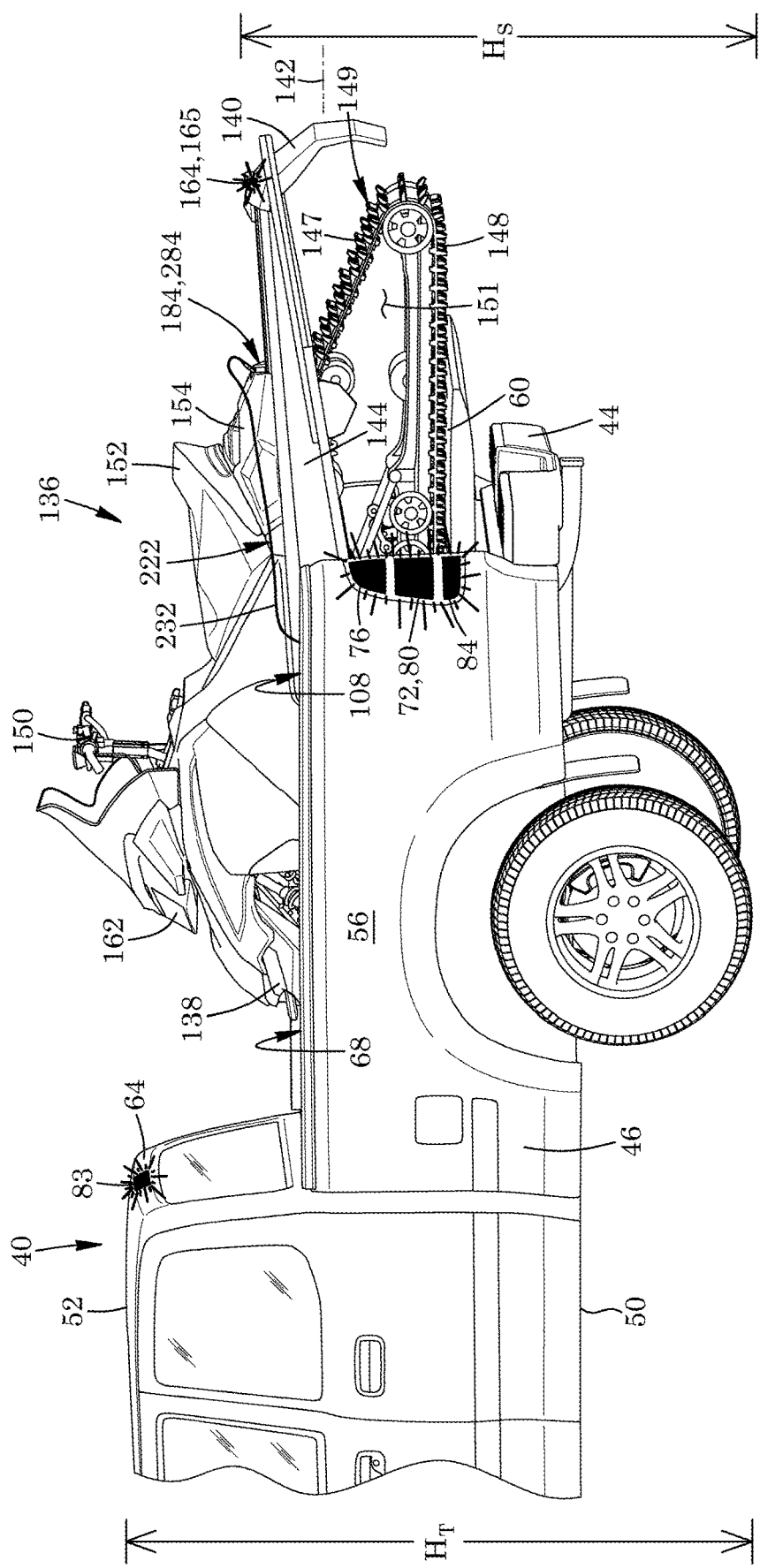
FIG. 18 is a left side perspective view thereof, with the front of the truck not being shown.

In such instances brake light 83 of the truck 40 may also be visible. Thus and referring to FIG. 16, the truck 40 so retrofitted or configured effectively includes a first pair of laterally-spaced-apart rear lights 72, 80 and 74, 84 and a second pair of longitudinally spaced-apart rear lights 83 and 164, 165 which are centrally-positioned and elevated relative to the first pair of laterally spaced-apart rear lights. As seen in FIG. 18, the rear lights 164, 165 of the snowmobile 136 are positioned at a height $H_S$ equal to or below height $H_T$ of rear brake light 83.

Figure 10:
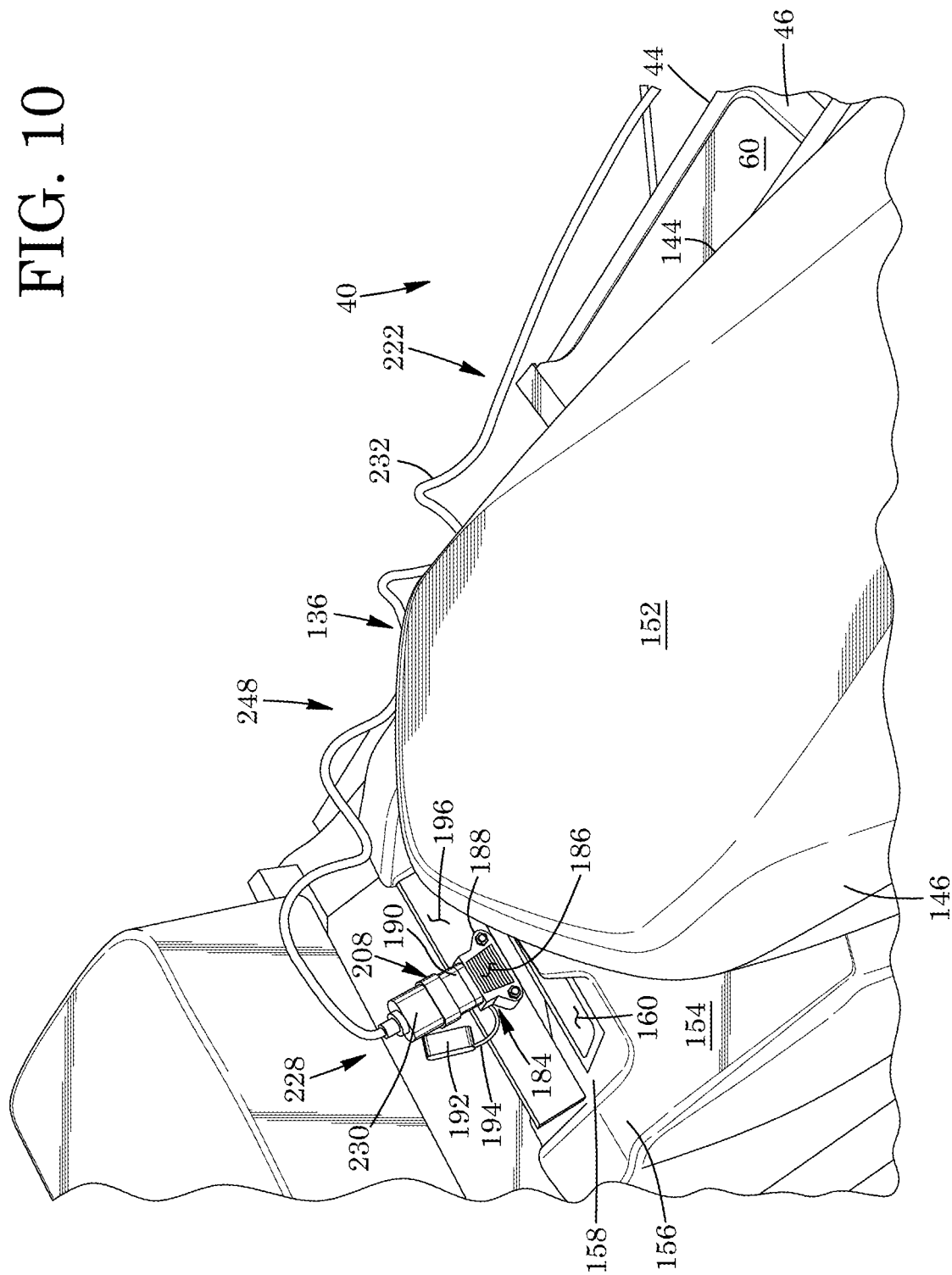
FIG. 10 is a top perspective view of the snowmobile loaded onto the truck, together with the wiring harness of FIG. 9 including a second end portion shown coupled to the electrical interface of the snowmobile, with the rest of the wiring harness, the truck and the snowmobile being shown in fragment.

The electrical interfaces 108 and 184 and wiring harness 222 seen in FIGS. 9 and 10 may be referred to as a kit 248 for repurposing existing one or more rear lights 164 and 165 of a first vehicle or snowmobile 136 seen in. FIG. 2, to be one or more additional rear lights of a second vehicle or truck 40 upon which the snowmobile is loaded.

There is accordingly provided a method of improving road safety when a first vehicle, in this example snowmobile 136, is loaded onto a second vehicle, in this example, truck 40. There is further provided a method of safely transporting the snowmobile with the truck, and a method of retrofitting the snowmobile and the truck to facilitate transportation of the snowmobile on the cargo bed 54 of the truck. The method includes loading the snowmobile onto to the cargo bed of the truck such that the rear lights 164, 165 of the snowmobile are spaced-apart above the rear lights 72, 74, 80 and 82 of the truck 40 as seen in FIG. 16.

As seen in FIG. 13, the method includes retrofitting the snowmobile 136 with electrical interface 184. The method includes coupling the electrical interface to one or more rear lights 164 and 165 of the snowmobile seen in FIG. 1, in this example via light wires 166, 168 and 170 of the snowmobile seen in FIG. 13. Referring back to FIG. 1, the method further including mounting the electrical interface 184 between the front 138 and rear 140 of the snowmobile 136. The method includes mounting the electrical interface rearward of the one or more seats 152 of the snowmobile in this example. As seen in FIG. 7, the method includes coupling the elongate mounting plate 196 to the snowmobile 136 and mounting the electrical interface 184 to the elongate mounting plate.

As seen in FIG. 3, the method includes providing the truck 40 with an electrical interface 108. The method includes coupling the electrical interface to one or more light wires 72, 80, 74 and 84 of the truck seen in FIG. 2. The method includes mounting the electrical interface 108 of the truck 40 adjacent to said rear lights of the truck. The method includes mounting the electrical interface of the truck to one of the side walls 56 of the truck.

The method includes coupling at least one rear light of the truck 40 to at least one rear light 164, 165 of the snowmobile via wiring harness 222 as seen in FIGS. 9 and 10, such that the truck powers the at least one rear light of the snowmobile and the rear lights of the vehicles work in concert. As seen in FIG. 13, the method includes providing a mechanism in the form of diode 240 to disable operation of one or more headlamps 162 of the snowmobile 136 seen in. FIG. 1 when the wiring harness 222 electrically couples together the snowmobile and truck 40.

The method includes shaping the wiring harness to selectively extend between and couple together the electrical interfaces 108 and 184. The method includes sizing the wiring harness 222 to be equal to or less than one half or one third of the length. Ls of the snowmobile 136 seen in FIG. 1. As seen in FIG. 2, the method includes sizing the wiring harness to be equal to or less than one half of the width $W_T$ of the truck 40. The method includes enclosing the wiring harness 222 at least in part between the side walls 56 and 58 of the truck.

As seen in FIG. 8, electrical interface 208 may also be used as an external power supply when the snowmobile 136 is running or turned on, for example.

Figure 19:
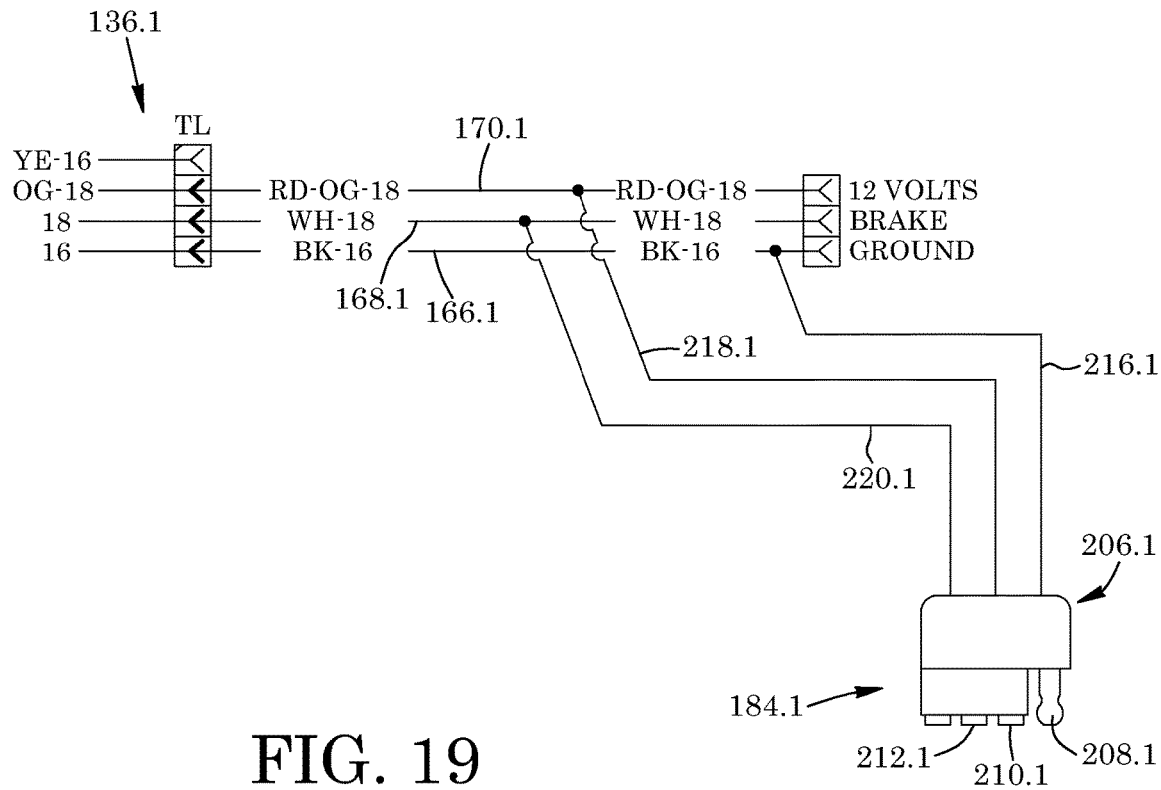
FIG. 19 is a schematic view of a plurality of wires of a snowmobile together with an electrical interface coupled thereto according to a second aspect, the electrical interface being part of a kit for repurposing existing one or more rear lights of the snowmobile to couple to and work in concern with one or more rear lights of a second vehicle or truck upon which the snowmobile is loaded, the kit including a wiring harness in the process of coupling to the electrical interface, the wiring harness being shown in fragment.

FIGS. 19 to 20 show a kit 248.1 according to a second aspect, for repurposing existing one or more rear lights of a first vehicle such as a snowmobile 136, to be one or more additional rear lights of a second vehicle or truck (not shown) upon which the snowmobile is loaded. Like parts have like numbers and functions as the kit 248, the truck and the snowmobile 136 shown in FIGS. 1 to 19 with the addition of decimal extension ".1". Kit 248.1, the truck and the snowmobile 136.1 are substantially the same as the kit 248, truck 40 and snowmobile 136 shown in FIGS. 1 to 19 with the following exceptions.

As seen in FIG. 19, the snowmobile is retrofitted to include a mechanism to inhibit power from the truck to operate of the headlamps thereof, in this example in the form of replacing the conventional two-way high-beam/low-beam headlamp switch module 250 of the snowmobile with a three way high-beam/low-beam/off headlamp switch module 252. The high-beam/low-beam switch module of the snowmobile is removed and replaced with the three-way switch module.

However this is not strictly required and the snowmobile may, in the alternative, be manufactured in the first instance to be so configured.

The three-way switch module 252 includes a first terminal 254 coupled to high-beam headlamps (not shown) of the snowmobile 136.1, a second terminal 256 coupled to a low-beam headlamp (not shown) of the snowmobile, and a third terminal 258. The switch module includes a switch 253 that may be selectively moved in a first direction, as shown by arrow 262, to couple together terminals 254 and 260 to turn on or power the high-beam headlamp. The switch may be referred to as a three-pole off-switch. The switch 253 may be selectively moved in a second direction, as shown by arrow 264 and which is opposite the first direction, to couple together terminals 258 and 260 to turn on or power the low-beam headlamps.

The switch is selectively movable to a third position between and spaced-apart from terminals 256 and 258, where no power is provided to said terminals and the low-beam and high-beam headlamps remain off. The switch module 252 thus enables the operator of the snowmobile to switch between a high beam headlamp configuration in which the high beam headlamp(s) of the snowmobile are turned on, to a low beam headlamp configuration in which the low beam headlamp(s) of the snowmobile are turned on, to a no headlamps configuration in which no power is provided to the headlamps and the headlamps remain off during operation of the snowmobile or otherwise. Thus, the snowmobile 136.1 so retrofitted includes the three way high-beam/low-beam/off headlamp switch module 252 so that the headlamps of the snowmobile are not powered when the snowmobile is electrically coupled to the truck. However this is not strictly required and the snowmobile may, in the alternative, be manufactured in the first instance to be so configured.

Figure 21:
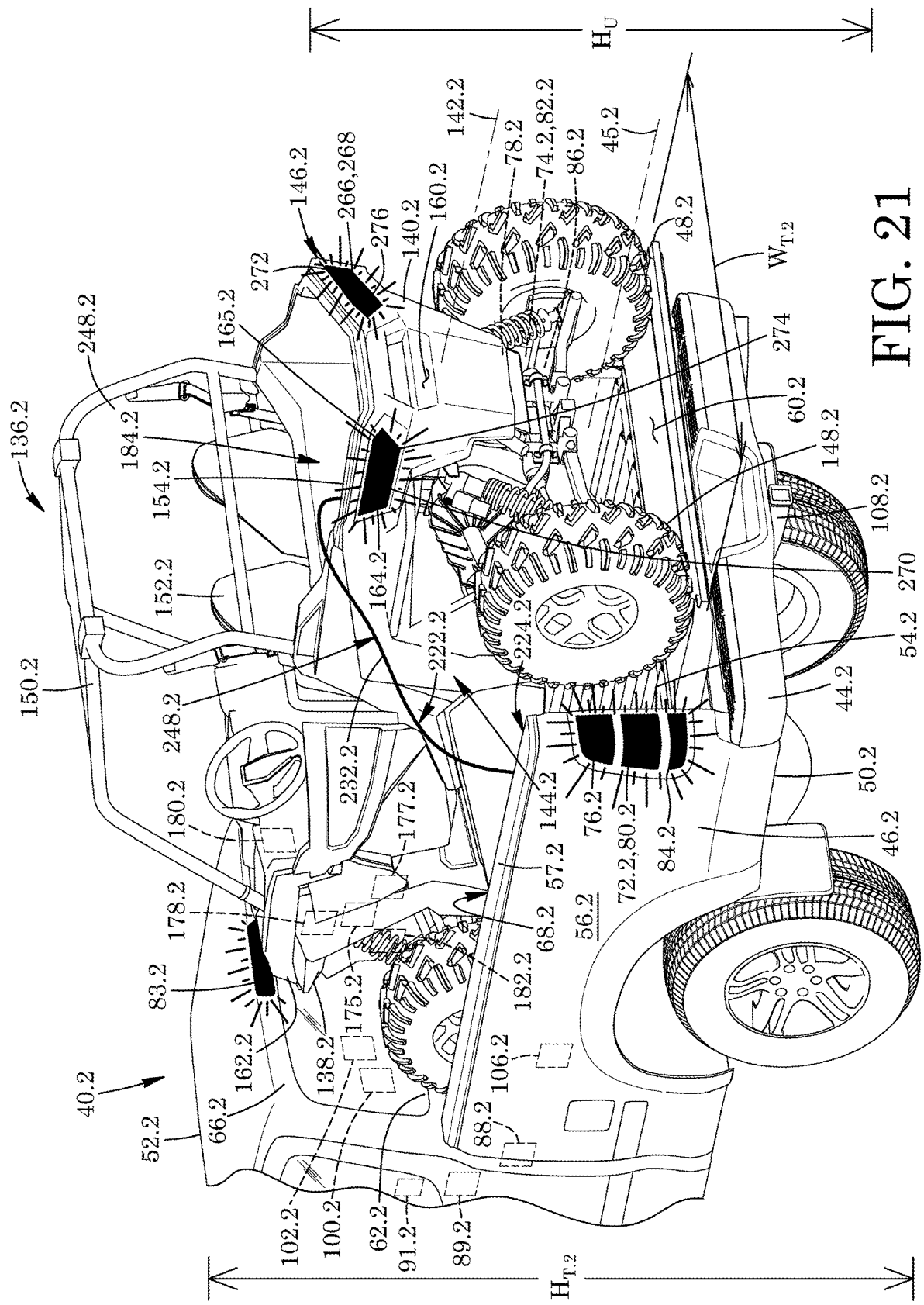
FIG. 21 is a left side, rear perspective view of a utility task vehicle (UTV) loaded onto the cargo bed of a truck, with the front of the truck being not shown, with the utility task vehicle and the truck being according to a third aspect and further including a kit for repurposing existing one or more rear lights of the utility task vehicle to couple to and work in concern with one or more rear lights of the truck.
Figure 22:
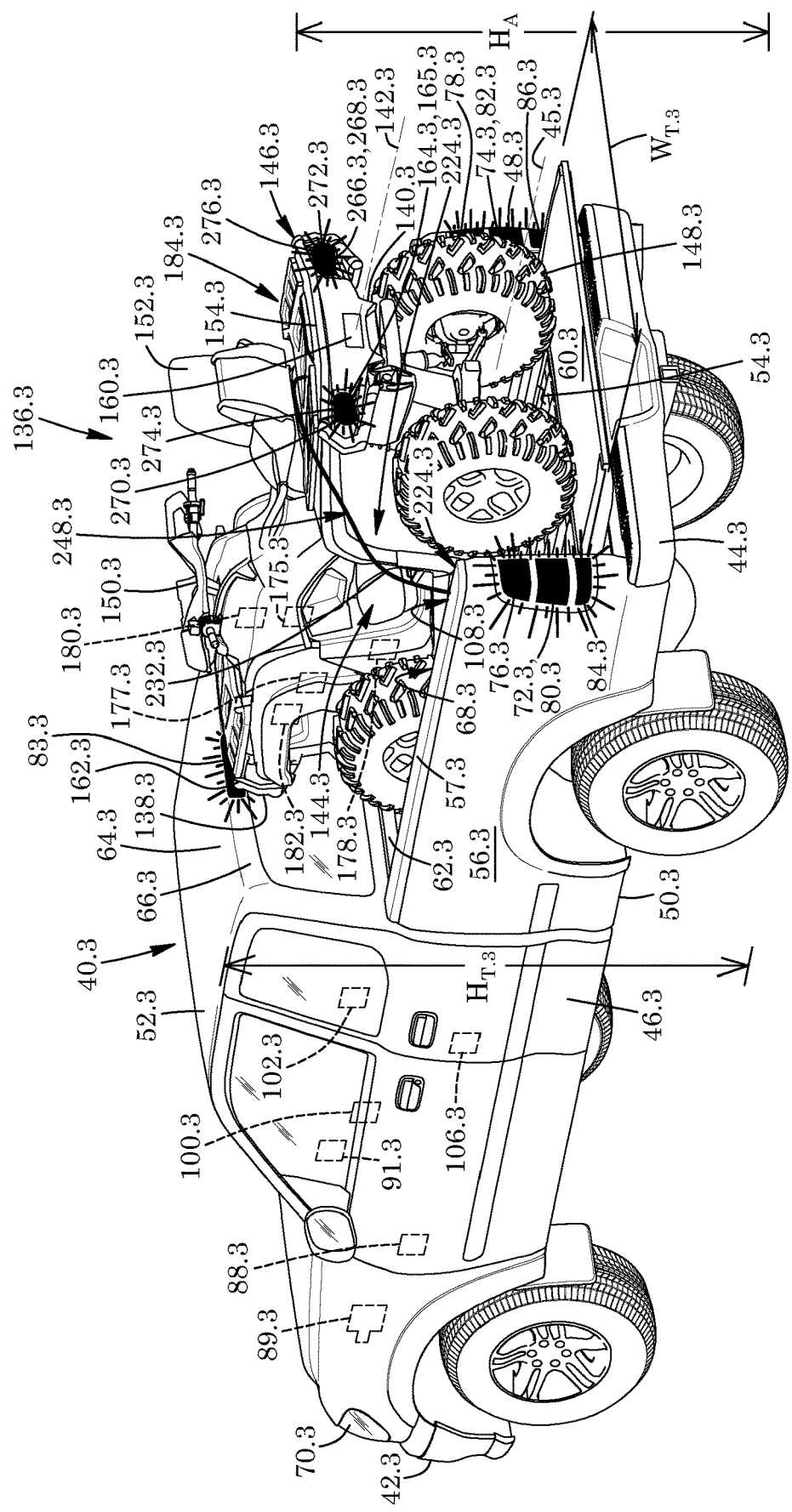
FIG. 22 is a left side, rear perspective view of a all-terrain vehicle (ATV) loaded onto the cargo bed of a truck, with the front of the truck being not shown, with the all-terrain vehicle and the truck being according to a fourth aspect, and further including a kit for repurposing existing one or more rear lights of the all-terrain vehicle to couple to and work in concern with one or more rear lights of the truck.

FIG. 21 shows a first vehicle, in this example an utility terrain vehicle (UTV) 136.2 according to a second aspect, loaded onto a second vehicle, in this example, truck 40.2, including kit 248.2 for repurposing existing one or more rear lights of the utility terrain vehicle to be one or more additional rear lights of the truck upon which the utility terrain vehicle is loaded. Like parts have like numbers and functions as the kit 248, truck 40 and snowmobile 136 shown in FIGS. 1 to 19 with the addition of decimal extension ".2". Kit 248.2, truck 40.2 and utility terrain vehicle 136.2 are substantially the same as the kit 248, truck 40 and snowmobile 136 shown in FIGS. 1 to 19 with the following exceptions.

The utility terrain vehicle in this case a side-by-side; however, this is not strictly required and the utility terrain vehicle may be of a different type in other embodiments. The utility terrain vehicle 136.2 includes a pair of laterally spaced-apart rear running lights 164.2 and 266, rear brake lights 165.2 and 268, left and right turn signal lights 270 and 272, and backup or reverse drive lights 274 and 276. However, the latter two sets of lights are not strictly required as some utility terrain vehicles may not include signal and reverse drive lights, for example. The front lights 162.2 and rear running lights are coupled to a power supply, in this example battery 178.2 of the utility terrain vehicle 136.2 for operating the lights when the vehicle is turned off. The utility terrain vehicle's lights are powered by magneto 177.2 and related electrical system when the vehicle is running. Batteries and magnetos, including their various parts and functionings thereof, are well known to those skilled in the art and the battery and magneto of the utility terrain vehicle 136.2 will accordingly not be discussed in further detail.

In operation, actuating light switch 91.2 of the truck 40.2 causes power to be supplied to the rear running lights 72.2 and 74.2 of the truck and rear running lights 164.2 and 266 of the utility terrain vehicle, turning on of these lights thereby. Activating the brake system 182.2 of the truck causes brake lights 80.2 and 82.2 of the truck to turn on, as well as brake lights 165.2 and 268 of the utility terrain vehicle.

Thus, truck 40.2 so retrofitted or configured effectively includes a first set or pair of laterally-spaced-apart rear lights 72.2, 80.2 and 74.2, 84.2, a second set or pair of laterally spaced-apart rear lights 164.2, 165.2 and 266, 268 which are inwardly spaced from the first pair of laterally spaced-apart rear lights, and a third set or pair of longitudinally spaced-apart rear lights 83.2 and 270, 272, 274 and 276 which are centrally-positioned and elevated relative to the first pair of laterally spaced-apart rear lights. The rear lights of the utility terrain vehicle 136.2 are positioned at a height Flu equal to or above height $H_{T.2}$ of rear brake light 83.2.

FIG. 21 shows a first vehicle, in this example an all-terrain vehicle (ATV) 136.3 according to a third aspect, loaded onto a second vehicle, in this example, truck 40.3, including kit 248.3 for repurposing existing one or more rear lights of the all-terrain vehicle to be one or more additional rear lights of the truck upon which the all-terrain vehicle is loaded. Like parts have like numbers and functions as the kit 248, truck 40 and snowmobile 136 shown in FIGS. 1 to 19 with the addition of decimal extension ".3". Kit 248.3, truck 40.3 and all-terrain vehicle 136.3 are substantially the same as the kit 248, truck 40 and snowmobile 1.36 shown in FIGS. 1 to 19 with the following exceptions.

The all-terrain vehicle in this case a quad or four-wheeler; however, this is not strictly required and the all-terrain vehicle may be of a different type in other embodiments. The all-terrain vehicle 136.3 includes a pair of laterally spaced-apart rear running lights 164.3 and 266.3, rear brake lights 165.3 and 268.3, left and right turn signal lights 270.3 and 272.3, and backup or reverse drive lights 274.3 and 276.3. However, the latter two sets of lights are not strictly required as some all-terrain vehicles may not include signal and reverse drive lights, for example. The front lights 162.3 and rear running lights are coupled to a power supply, in this example battery 178.3 of the all-terrain vehicle 136.3 for operating the lights when the vehicle is turned off. The all-terrain vehicle's lights are powered by magneto 177.3 and related electrical systems when the vehicle is running Batteries and magnetos, including their various parts and functionings thereof, are well known to those skilled in the art and the battery and magneto of the all-terrain vehicle 136.3 will accordingly not be discussed in further detail.

In operation, actuating light switch 91.3 of the truck 40.3 causes power to be supplied to the rear running lights 72.3 and 74.3 of the truck and rear running lights 164.3 and 266.3 of the all-terrain vehicle, turning on of these lights thereby. Activating the brake system 182.3 of the truck causes brake lights 80.3 and 82.3 of the truck to turn on, as well as brake lights 165.3 and 268.3 of the all-terrain vehicle.

Thus, truck 40.3 so retrofitted or configured effectively includes a first set or pair of laterally-spaced-apart rear lights 72.3, 80.3 and 74.3, 84.3, a second set or pair of laterally spaced-apart rear lights 164.3, 165.3 and 266.3, 268.3 which are inwardly spaced from the first pair of laterally spaced-apart rear lights, and a third set or pair of longitudinally spaced-apart rear lights 83.3 and 270.3, 272.3, 274.3 and 276.3 which are centrally-positioned and elevated relative to the first pair of laterally spaced-apart rear lights. The rear lights of the all-terrain vehicle 136.3 are positioned at a height HA equal to or below height $H_{T.3}$ of rear brake light 83.3.

Figure 25:
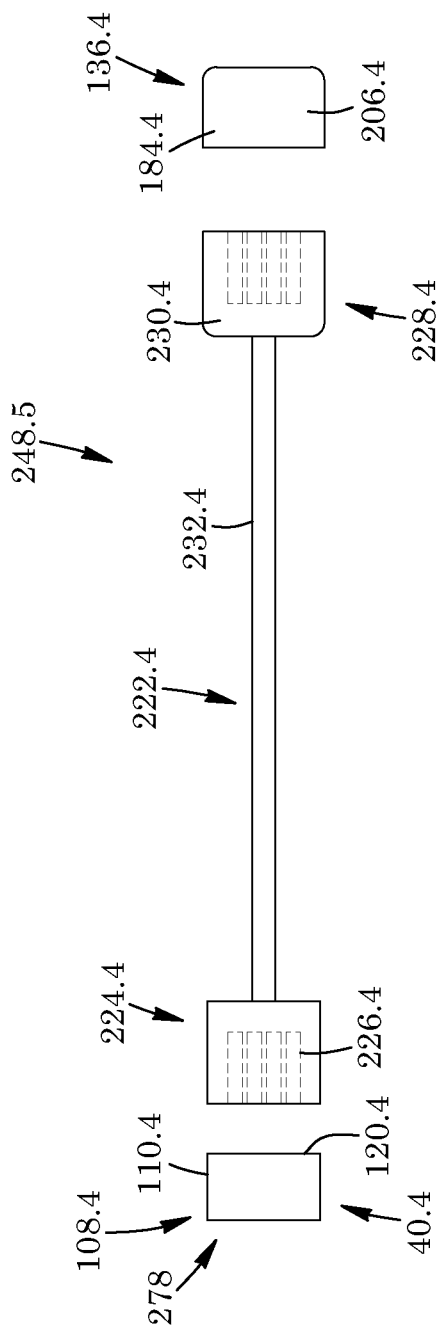
FIG. 25 is a schematic view of the electrical interface of the truck of FIG. 23, together an electrical interface of the second vehicle according to the fifth aspect, and a wiring harness coupling together the electrical interfaces.

FIGS. 23 to 25 show a kit 248.4 according to a fifth aspect, for repurposing existing one or more rear lights of a secondary vehicle 136.4, to be one or more additional rear lights of a primary vehicle or truck 40.4 upon which the secondary vehicle is loaded. Like parts have like numbers and functions as the kit 248, the truck and the snowmobile 136 shown in FIGS. 1 to 19 with the addition of decimal extension ".4". Kit 248.4, truck 40.4 and secondary vehicle 136.4 are substantially the same as the kit 248, truck 40 and snowmobile 136 shown in FIGS. 1 to 19 with the following exceptions.

As seen in FIG. 23, the truck includes electrical interface 108.4 comprising a seven-pin trailer connector 278. The trailer connector may be located adjacent to the trailer hitch (not shown) and rear of the truck 40.4. The seven-pin trailer connector includes a housing 110.4 with a protective member in the form of a planar cover 116.4. The planar cover hingedly couples to the housing. The planar cover 116.4 is spring biased to enclose electrical socket 120.4.

As seen in FIG. 24, the electrical interface 108.4 includes a plurality of pins or terminals 280, 282, 284, 286, 288, 290 and 292. Ground wire 90.4 of the truck 40.4 couples to terminal 280. Brake light wire 92.4 of the truck couples to terminal 282. A right turn signal wire 294 of the truck 40.4 couples to terminal 284. A left turn signal wire 296 of the truck couples to terminal 290. A power conductor or running lights wire 94.4 couples to terminal 286. A taillights wire 298 couples to terminal 288. An auxiliary component wire 300 couples to terminal 292.

As seen in FIG. 25, electrical socket 226.4 of electrical interface 224.4 of wiring harness 222.4 is configured to selectively couple to seven-pin connector 278 in this example. The wiring harness may be otherwise substantially the same as described above. Thus, one runs the brake light line of the secondary vehicle to the trailer brake terminal and make a harness up that may.

The wiring harness 222.4 may be configured to couple the reverse drive or tail wires/lights of the truck 40.4 and the secondary vehicle 136.4, to a reverse drive system of the truck. The latter causes the reverse drive wire/lights of the secondary vehicle to turn on upon receiving one or more activation signals therefrom. The wiring harness 222 may further be configured to couple the turn signal lights/wires of the truck 40.4 and secondary vehicle, causing the turn signal lights of the secondary vehicle 136.4 to turn on upon receiving one or more activation signals therefrom. The loaded or secondary vehicle, if so equipped with signal and reverse drive lights, would thus have the signals and reverse drive lights thereof working with the truck 40.4 in harmony.

Figure 26:
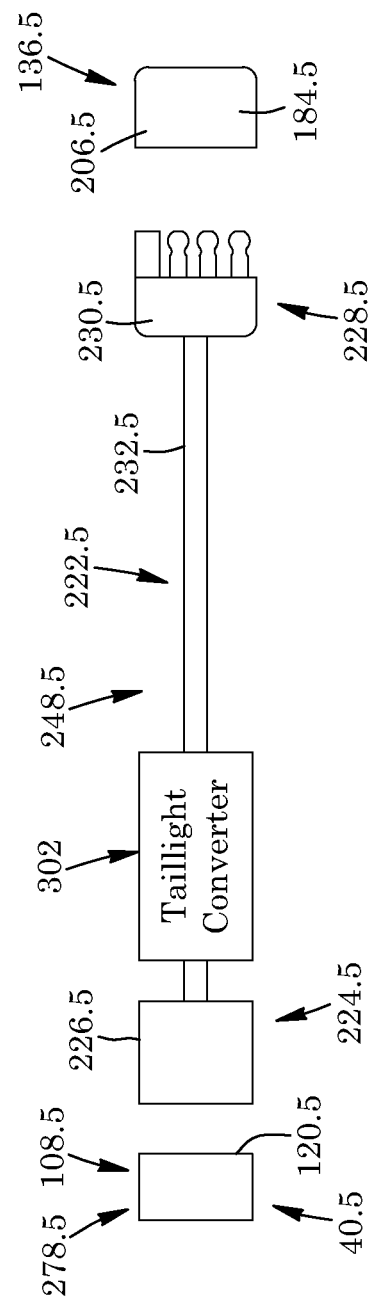
FIG. 26 is a schematic view of an electrical interface of a first vehicle according to a sixth aspect, together an electrical interface of a second vehicle thereof upon which the first vehicle is loaded, the second vehicle being according to the sixth aspect, together with a wiring harness coupling together the electrical interfaces, the electrical interfaces and wiring harness comprising a kit for repurposing existing one or more rear lights of the first vehicle to couple to and work in concern with one or more rear lights of the second vehicle.

FIG. 26 shows a kit 248.5 according to a sixth aspect, for repurposing existing one or more rear lights of a secondary vehicle 136.5, to be one or more additional rear lights of a primary vehicle or truck 40.5 upon which the secondary vehicle is loaded. Like parts have like numbers and functions as the kit 248.4, truck 40.4 and secondary vehicle 136.4 shown in FIGS. 23 to 25 with decimal extension ".5" replacing decimal extension ".4". Kit 248.5, truck 40.5 and secondary vehicle 136.5 are substantially the same as the kit 248.4, truck 40.4 and secondary vehicle 136.4 shown in FIGS. 23 to 25 with the following exceptions.

Wiring harness 222.5 uses a seven-way or four-way trailer connector 278.5 by means of a taillight converter 302. The wiring harness may thus couple a combination of the turn signals and brake lights/wires of the truck to the brake wire/lights of the secondary vehicle. The combination turn signal and brake wire couples to signal and brake light wires of the truck. The latter causes the rear light or a brake light of the secondary vehicle to turn on upon receiving one or more activation signals therefrom.

Many advantages result from the structure of the present invention. For example, the assembly as herein described may function to improve road safety by effectively illuminating the truck and secondary vehicle thereon in a cost effective and compact manner. The assembly as herein described may further comprise a convenient and cost-effective solution to the requirement in many jurisdictions of adding a red rag, additional lighting or the like to goods loaded on a truck and which extend rearwards from the truck. The assembly as herein described may thus render the load in the form of the secondary vehicle much easier to see visually, warning drivers rearward of the load ahead and functioning to reduce rear end collisions. This may be particular advantageous as often all-terrain vehicles and snowmobiles are not covered by a primary vehicle's accident insurance policy.

The assembly as herein described may remove the need for recreational vehicle trailers, which may be costly, cumbersome, and impede safe driving. The assembly as herein described may thus comprise fewer parts, be more cost effective and promote safe driving.

The wiring harness as herein described remains within the truck bed and extends from adjacent one of the rear lights of the truck to the snowmobile. The wiring harness as herein described thus requires less length and may be less likely to get entangled and break.

The assembly as herein described takes advantage of existing wiring within the snowmobile which is more enclosed and protected.

The rear lights of the secondary vehicle so mounted to the truck bed as a result of the assembly as herein described are elevated and may thus be easier to see from a distance. The rear lights of the secondary vehicle may further effectively function as a replacement third brake light for the truck which takes the place of or supplements the existing third brake light of the truck which may be otherwise blocked.

The assembly as herein described may additionally require less space and may facilitate a greater variety and size of vehicles to be loaded on to the truck, for example.

It will be appreciated that many variations are possible within the scope of the invention described herein. For example, the secondary vehicle as herein described has been referenced as a snowmobile, all-terrain vehicle in the form of a buggy or side-by-side, or utility task vehicle in the form of a quad. However, this is not strictly required and the secondary vehicle may alternatively comprise a snow bike, golf cart, dune buggy, go kart, water craft, tractor, farm equipment, motorcycle, dirt bike, scooter, electric mobility devices (scooters), or any other such vehicle with original equipment manufacturer (OEM) brake lights.

Also some of the description herein has involved retrofitting the snowmobile/UTV/ATV and/or truck to couple electrical interfaces thereto. However, as mentioned this is not strictly required, as the electrical interface of the snowmobile/UTV/ATV may be place directly thereon at the factory in the assembly line, with a wiring harness being sold for coupling to a truck's trailer socket for example.

The assembly as herein described is described to a secondary vehicle loaded onto the cargo area of the box of a truck. Alternatively, the assembly may be loaded onto the sled deck, on a trailer, or anything that will connect to the running vehicle wire harness or in conjunction with a trailer harness hooked to the vehicle.

Additional Description

Examples of a method of improving road safety when a secondary vehicle is loaded onto a primary vehicle, as well a kit therefor, and a primary vehicle comprising enhanced rear lighting, have been described. The following clauses are offered as further description.

(1) A first vehicle shaped to be received on a cargo bed of a second vehicle, the first vehicle comprising: at least one rear light; and a wiring harness coupled to the rear light of the first vehicle and connectable to at least one electrically-powered rear light of the second vehicle so as to be powered therefrom and to function in concert therewith.

(2) A first vehicle loadable onto a second vehicle, the first vehicle comprising: at least one rear light; an electrical interface coupled to the at least one rear light; and a wiring harness including a first end portion connectable to the electrical interface and a second end portion connectable to a trailer socket of the second vehicle such that the rear lights of vehicles work in concert, with the at least one rear light of the first vehicle being controlled by and receiving power from the second vehicle.

(3) The first vehicle of any one clauses 1 to 2, wherein the wiring harness couples to the first vehicle adjacent to or forward of the at least one rear light of the first vehicle.

(4) The first vehicle of any one of clauses 1 to 3, wherein the first vehicle has a front, a rear and a length extending between the front and the rear thereof, and wherein the wiring harness has a length which is equal to or less than one half of the length of the first vehicle.

(5) The first vehicle of any one of clauses 1 to 3, wherein the first vehicle has a front, a rear and a length extending between the front and the rear thereof, and wherein the wiring harness has a length which is equal to or less than one third of the length of the first vehicle.

(6) The first vehicle of any one of clauses 1 to 5 wherein the first vehicle is a snowmobile.

(7) The first vehicle of any one of clauses 1 to 5 wherein the first vehicle is an all-terrain vehicle.

(8) The first vehicle of clause 7 wherein the all-terrain vehicle is a quad or four-wheeler.

(9) The first vehicle of any one of clauses 1 to 5 wherein the first vehicle is a utility task vehicle.

(10) The first vehicle of clause 9 wherein the utility task vehicle is a side-by-side.

(11) The first vehicle of any one of clauses 1 to 10, further including a first electrical interface which couples to the at least one rear light of the first vehicle, and wherein the wiring harness couples to said first electrical interface.

(12) The first vehicle of clause 11 wherein the first electrical interface is positioned between the front and the rear of the first vehicle.

(13) The first vehicle of any one of clauses 11 to 12, wherein the first vehicle includes one or more seats and wherein the first electrical interface is positioned rearward of said one or more seats.

(14) The first vehicle of any one of clauses 11 to 13, further including an elongate mounting plate coupled thereto and to which the first electrical interface mounts.

(15) The first vehicle of clause 14 wherein the elongate mounting plate is rigid.

(16) The first vehicle of any one of clauses 14 to 15, wherein the elongate mounting plate is rectangular in shape.

(17) The first vehicle of any one of clauses 1.4 to 16 wherein the elongate mounting plate extends between the sides of the first vehicle.

(18) The first vehicle of any one of clauses 14 to 17 wherein the first vehicle has a longitudinal axis extend from the front to the rear thereof and wherein the elongate mounting plate extends perpendicular to the longitudinal axis thereof.

(19) The first vehicle of any one of clauses 1 to 18, further including a mechanism to inhibit power from the second vehicle to operate of the one or more front lights of the first vehicle.

(20) The first vehicle of clause 19, wherein the mechanism is a diode that enables current from the second vehicle to flow in a first direction to selectively turn on the rear light of the first vehicle and inhibits current from the second vehicle to flow in a second direction to selectively turn on the one or more front lights of the first vehicle.

(21) The first vehicle of clause 19, wherein the mechanism is a switch which disables operation of the one or more front lights of the first vehicle.

(22) In combination, the first vehicle and the second vehicle of any one of clauses 1 to 21.

(23) The combination of clause 20, wherein the wiring harness remains within the cargo bed.

(24) The combination of any one of clauses 22 to 23, wherein the first vehicle includes at least one front light and wherein the wiring harness is positioned between the front light and the rear light of the first vehicle.

(25) The combination of any one of clauses 22 to 24, wherein the wiring harness is positioned forward of the rear lights of the vehicles.

(26) The combination of any one of clauses 22 to 25, wherein the wiring harness couples to the second vehicle adjacent to the at least one rear light of the second vehicle.

(27) The combination of any one of clauses 22 to 26, wherein the wiring harness is enclosed by at least in part by the second vehicle.

(28) The combination of any one of clauses 22 to 27, wherein the wiring harness is enclosed by side walls of the second vehicle.

(29) The combination of any one of clauses 22 to 28, wherein the second vehicle has a pair of spaced-apart sides, and wherein the wiring harness extends from a first said side of the second vehicle towards a second said side of the second vehicle.

(30) The combination of any one of clauses 22 to 27, wherein the second vehicle includes a pair of side walls, a tailgate extending between the side walls thereof, and a forward wall extending between the side walls thereof and being spaced-apart from the tailgate, and wherein the wiring harness is positioned between the side walls of the second vehicle and is positioned between the forward wall and the tailgate of the second vehicle.

(31) The combination of any one of clauses 22 to 30 wherein the second vehicle includes a pair of side walls, a tailgate extending between the side walls thereof, and a forward wall extending between the side walls thereof and being spaced-apart from the tailgate, wherein the cargo bed, the side walls, the tailgate and the forward wall of the second vehicle define an interior space, and wherein the wiring harness is positioned within said interior space.

(32) The combination of any one of clauses 22 to 31 wherein the second vehicle has a front, a rear, and a pair of spaced-apart sides extending from the front thereof to the rear thereof, and wherein the wiring harness is positioned between the sides of the second vehicle, and between the front and the rear of the second vehicle.

(33) The combination of any one of clauses 22 to 31 wherein the second vehicle includes a tailgate and wherein the wiring harness is positioned adjacent to the tailgate.

(34) The combination of any one of clauses 22 to 31 wherein the second vehicle includes a tailgate and wherein the wiring harness extends substantially parallel to and forward of the tailgate.

(35) The combination of any one of clauses 22 to 34 wherein the second vehicle has a width extending between the sides thereof, and wherein the wiring harness has a length which is equal to or less than one half of the width of the second vehicle.

(36) The combination of any one of clauses 22 to 35 wherein the at least one rear light of the first vehicle is elevated relative to the at least one rear light of the second vehicle.

(37) The combination of any one of clauses 22 to 36 wherein the wiring harness includes: a running lights wire which couples the rear lights to a power supply of the second vehicle; a brake lights wire which couples the rear lights or brakes lights of the second vehicle and the first vehicle, to a brake system of the second vehicle; and a reverse drive lights wire which couples the rear lights or reverse drive lights of the second vehicle and the first vehicle, to a reverse drive system of the second vehicle.

(38) The combination of clause 37 wherein the wiring harness includes a combination turn signal and brake wire which couples to signal and brake light wires of the second vehicle and causes the rear light or a brake light of the first vehicle to turn on upon receiving one or more activation signals therefrom.

(39) The combination of any one of clauses 22 to 38 wherein the second vehicle is a truck.

(40) The combination of any one of clauses 22 to 39 wherein the second vehicle includes a second electrical interface which couples to the at least one rear light of the second vehicle, and wherein the wiring harness couples to said second electrical interface.

(41) The combination of clause 40 wherein the second electrical interface is positioned adjacent to the at least one rear light of the second vehicle.

(42) The combination of any one of clauses 40 to 41, wherein the second electrical interface mounts to one of the side walls of the second vehicle.

(43) A method of safely transporting a first vehicle with a second vehicle, the method comprising: loading the first vehicle onto to a cargo bed of the second vehicle; and coupling at least one rear light of the second vehicle to at least one rear light of the first vehicle via a wiring harness, such that the second vehicle powers the at least one rear light of the first vehicle and the rear lights of the vehicles work in concert.

(44) The method of clause 43, further including: providing the first vehicle with a first electrical interface and coupling the first electrical interface coupling to one or more light wires of the first vehicle; and providing the second vehicle with a second electrical interface and coupling the second electrical interface to one or more light wires of the second vehicle.

(45) The method of clause 44 further including shaping the wiring harness to selectively extend between and couple together the electrical interfaces.

(46) The method of any one of clauses 44 to 45, further including mounting the second electrical interface adjacent to the at least one rear light of the second vehicle.

(47) The method of any one of clauses 44 to 46, wherein the first vehicle has a front and a rear, and the method further including mounting the first electrical interface between the front and the rear of the first vehicle.

(48) The method of any one of clauses 44 to 47, wherein the first vehicle includes one or more seats and wherein the method further includes mounting the first electrical interface rearward of the one or more seats of the first vehicle.

(49) The method of any one of clauses 44 to 48, further including coupling an elongate mounting plate to the first vehicle and mounting the first electrical interface to said elongate mounting plate.

(50) The method of clause 49 wherein the elongate mounting plate is rigid and extends between the sides of the first vehicle.

(51) The method of any one of clauses 44 to 50, wherein the second vehicle includes a pair of spaced-apart side walls which couple to and extend upwards from the cargo bed and wherein the method further includes mounting the second electrical interface to one said side wall of the second vehicle.

(52) The method of any one of clauses 43 to 50, wherein the second vehicle includes a pair of spaced-apart side walls which couple to and extend upwards from the cargo bed and wherein the method further includes enclosing the wiring harness between side walls of the second vehicle.

(53) The method of any one of clauses 43 to 52 further including: providing a mechanism to disable operation of one or more front lights of the first vehicle when the wiring harness electrically couples together the vehicles.

(54) The method of clause 53 wherein the mechanism is a diode that enables current from the second vehicle to flow in a first direction to selectively turn on the rear light of the first vehicle and inhibits current from the second vehicle to flow in a second direction to selectively turn on the one or more front lights of the first vehicle.

(55) The method of clause 53 wherein the mechanism is a switch which disables operation of the one or more front lights of the first vehicle.

(56) A method of retrofitting a first vehicle and a second vehicle to facilitate transportation of the first vehicle on a cargo bed of the second vehicle, the method comprising: providing the first vehicle with a first electrical interface; coupling rear light wires of the first vehicle to the first electrical interface; providing the second vehicle with a second electrical interface; coupling rear light wires of the second vehicle to the second electrical interface; and selectively coupling together the first electrical interface with the second electrical interface such that rear lights of the vehicles work in concert, with the second vehicle powering at least one said rear light of the first vehicle.

(57) The method of clause 56 further including providing a wiring harness via which the first electrical interface and the second electrical interface couple.

(58) The method of any one of clauses 56 to 57, further including: mounting the first electrical interface to the first vehicle.

(59) The method of any one of clauses 56 to 57, further including: coupling an elongate mounting plate to the first vehicle and mounting the first electrical interface to the first vehicle via said elongate mounting plate.

(60) The method of any one of clauses 56 to 59, further including: mounting the second electrical interface to the second vehicle.

(61) The method of any one of clauses 43 to 60 further including: loading the first vehicle onto the second vehicle such that said rear light of the first vehicle is spaced-apart above said rear light of the second vehicle.

(62) The method of any one of clauses 43 to 61 wherein the first vehicle has a length extending between the front and the rear thereof, and wherein the method includes sizing the wiring harness to be equal to or less than one half of the length of the first vehicle.

(63) The method of any one of clauses 43 to 61 wherein the first vehicle has a length extending between the front and the rear thereof, and wherein the method includes sizing the wiring harness to be equal to or less than one third of the length of the first vehicle.

(64) The method of any one of clauses 43 to 61 wherein the second vehicle has a width extending between the sides thereof, and wherein the method includes sizing the wiring harness to be equal to or less than one half of the width of the second vehicle.

(65) The method of any one of clauses 43 to 64, wherein the first vehicle is snowmobile.

(66) The method of any one of clauses 43 to 64, wherein the first vehicle is an all-terrain vehicle.

(67) The method of clause 66, wherein the all-terrain vehicle is a quad or four-wheeler.

(68) The method of any one of clauses 53 to 64, wherein the first vehicle is a utility task vehicle.

(69) The method of clause 68, wherein the utility task vehicle is a side-by-side.

It will be understood by someone skilled in the art that many of the details provided above are by way of example only and are not intended to limit the scope of the invention which is to be determined with reference to at least the following claims.

What is claimed is:

1. A method of improving road safety when a first vehicle is loaded onto a second vehicle, the method comprising:
   providing the first vehicle with a first electrical interface coupled to at least one rear light of the first vehicle;
   providing the second vehicle with a second electrical interface coupled to at least one rear light of the second vehicle;
   coupling together the electrical interfaces via a wiring harness such that the rear lights of the vehicles work in concert, with the at least one rear light of the first vehicle being controlled by and receiving power from the second vehicle; and
   providing a mechanism to disable operation of one or more front lights of the first vehicle when the wiring harness electrically couples together the vehicles.

2. The method of claim 1, further including mounting the second electrical interface adjacent to the at least one rear light of the second vehicle.

3. The method of claim 1, wherein the second vehicle includes a cargo bed upon which the first vehicle is loaded and includes a pair of spaced-apart side walls which couple to and extend upwards from the cargo bed, and wherein the method further includes:
   mounting the second electrical interface to one said side wall of the second vehicle; and
   positioning the wiring harness at least in part between the side walls of the second vehicle.

4. The first vehicle manufactured or retrofitted according to the method of claim 1.

5. A kit for repurposing existing one or more rear lights of a first vehicle to be one or more additional rear lights of a second vehicle upon which the first vehicle is loaded, the kit comprising:
   a first electrical interface retrofitted to the first vehicle, the first electrical interface coupling to the one or more rears light of the first vehicle;
   a second electrical interface retrofitted or coupled to the second vehicle, the second electrical interface coupling to at least one electrically-powered rear light of the second vehicle;
   a wiring harness coupling the electrical interfaces together, with the one or more rear lights of the first vehicle coupling to the at least one electrically-powered rear light of the second vehicle so as to be powered therefrom and to function in concert therewith; and
   a mechanism to disable operation of one or more front lights of the first vehicle when the wiring harness electrically couples together the first vehicle and the second vehicle.

6. The kit as claimed in claim 5 wherein each said electrical interface comprises a housing, an electrical socket positioned at least in part within the housing, and a cap coupled to the housing and shaped to selectively enclose the electrical socket thereof.

7. The kit as claimed in claim 5, further including an elongate mounting plate connectable to the first vehicle and to which the first electrical interface mounts.

8. The kit as claimed in claim 5, wherein the mechanism is a switch which disables operation of the one or more front lights of the first vehicle.

9. In combination, the kit as claimed in claim 5 and the first vehicle therefor, wherein the first electrical interface is positioned between the front and the rear of the first vehicle.

10. In combination, the kit as claimed in claim 5 and the first vehicle therefor, wherein the first vehicle has a front, a rear and a length extending between the front thereof and the rear thereof, and wherein the wiring harness has a length which is equal to or less than one half of the length of the first vehicle.

11. In combination, the kit as claimed in claim 5 and the second vehicle therefor, wherein the second electrical interface is positioned adjacent to the at least one rear light of the second vehicle and wherein the wiring harness couples to the second vehicle adjacent to the at least one rear light of the second vehicle.

12. In combination, the kit as claimed in claim 5 and the second vehicle therefor, wherein the second vehicle includes a cargo bed upon which the first vehicle is loaded, and wherein the wiring harness is positioned to remain within the cargo bed and be enclosed by at least in part by the second vehicle.

13. In combination, the kit as claimed in claim 5 and the second vehicle therefor, wherein the second vehicle has a pair of spaced-apart sides, and wherein the wiring harness extends from a first said side of the second vehicle towards a second said side of the second vehicle.

14. The kit as claimed in claim 5, wherein the mechanism is a diode that enables current from the second vehicle to flow in a first direction to selectively turn on the one or more rear lights of the first vehicle and inhibits current from the second vehicle to flow in a second direction which would otherwise turn on the one or more front lights of the first vehicle.

15. In combination, the kit as claimed in claim 5, the first vehicle therefor and the second vehicle therefor, wherein the one or more rear lights of the first vehicle are elevated relative to the at least one rear light of the second vehicle.

16. In combination, the kit as claimed in claim 5, the first vehicle therefor and the second vehicle therefor, wherein the one or more rear lights of the first vehicle are controlled by the second vehicle, wherein the first vehicle is one of a snowmobile, an all-terrain vehicle and a utility task vehicle, and wherein the second vehicle is a truck.

17. A kit as claimed in claim 5, wherein the wiring harness includes two or more of:
  a running lights wire which couples the one or more rear lights of the first vehicle to a power supply of the second vehicle;
  a brake lights wire which couples one or more brakes lights or said one or more rear lights of the first vehicle to a brake system of the second vehicle;
  a reverse drive lights wire which couples one or more reverse drive lights of the first vehicle to a reverse drive system of the second vehicle; and
  a combination turn signal and brake wire which couples to signal and brake light wires of the second vehicle and causes a respective said rear light of the first vehicle or a respective said brake light of the first vehicle to turn on upon receiving one or more activation signals therefrom.

18. A kit for repurposing existing one or more rear lights of a first vehicle to be one or more additional rear lights of a second vehicle upon which the first vehicle is loaded, the kit comprising:
  a first electrical interface retrofitted to the first vehicle, the first electrical interface coupling to the one or more rears light of the first vehicle;
  a second electrical interface retrofitted or coupled to the second vehicle, the second electrical interface coupling to at least one electrically-powered rear light of the second vehicle;
  a wiring harness coupling the electrical interfaces together, with the one or more rear lights of the first vehicle coupling to the at least one electrically-powered rear light of the second vehicle so as to be powered therefrom and to function in concert therewith; and
  a mechanism to inhibit one or more front lights of the first vehicle from turning on as a result of power from the second vehicle.

19. The kit as claimed in claim 18 wherein the mechanism is a diode that enables current from the second vehicle to flow in a first direction to selectively turn on the one or more rear lights of the first vehicle and inhibit current from the second vehicle to flow in a second direction to selectively turn on the one or more front lights of the first vehicle.

20. The kit as claimed in claim 18 wherein the mechanism is a switch which disables operation of the one or more front lights of the first vehicle.

\* \* \* \* \*

UNITED STATES PATENT AND TRADEMARK OFFICE
CERTIFICATE OF CORRECTION

PATENT NO. : 11,833,953 B2  
APPLICATION NO. : 17/535476  
DATED : December 5, 2023  
INVENTOR(S) : Dax Kurtz Page 1 of 1

It is certified that error appears in the above-identified patent and that said Letters Patent is hereby corrected as shown below:

In the Claims

Column 22, Line 12, Claim 5 should read as follows:
5. A kit for repurposing existing one or more rear lights of a first vehicle to be one or more additional rear lights of a second vehicle upon which the first vehicle is loaded, the kit comprising:
a first electrical interface retrofitted to the first vehicle, the first electrical interface coupling to the one or more rear lights of the first vehicle;
a second electrical interface retrofitted or coupled to the second vehicle, the second electrical interface coupling to at least one electrically-powered rear light of the second vehicle;
a wiring harness coupling the electrical interfaces together, with the one or more rear lights of the first vehicle coupling to the at least one electrically-powered rear light of the second vehicle so as to be powered therefrom and to function in concert therewith; and
a mechanism to disable operation of one or more front lights of the first vehicle when the wiring harness electrically couples together the first vehicle and the second vehicle.

Column 24, Line 4, Claim 18 should read as follows:
18. A kit for repurposing existing one or more rear lights of a first vehicle to be one or more additional rear lights of a second vehicle upon which the first vehicle is loaded, the kit comprising:
a first electrical interface retrofitted to the first vehicle, the first electrical interface coupling to the one or more rear lights of the first vehicle;
a second electrical interface retrofitted or coupled to the second vehicle, the second electrical interface coupling to at least one electrically-powered rear light of the second vehicle;
a wiring harness coupling the electrical interfaces together, with the one or more rear lights of the first vehicle coupling to the at least one electrically-powered rear light of the second vehicle so as to be powered therefrom and to function in concert therewith; and
a mechanism to inhibit one or more front lights of the first vehicle from turning on as a result of power from the second vehicle.

Signed and Sealed this  
Twelfth Day of August, 2025

Coke Morgan Stewart  
*Acting Director of the United States Patent and Trademark Office*